United States Patent [19]

Zellweger

[11] Patent Number: 5,630,125
[45] Date of Patent: May 13, 1997

[54] METHOD AND APPARATUS FOR INFORMATION MANAGEMENT USING AN OPEN HIERARCHICAL DATA STRUCTURE

[76] Inventor: Paul Zellweger, 12 Holworthy Pl., Cambridge, Mass. 02138

[21] Appl. No.: 247,688

[22] Filed: May 23, 1994

[51] Int. Cl.$^6$ .............................. G06F 17/30; G06F 15/82
[52] U.S. Cl. .......................... 395/614; 395/601; 395/611; 395/613; 364/992; 364/222.3
[58] Field of Search ............................ 395/600; 364/200, 364/551.01, 401, 900

[56] References Cited

U.S. PATENT DOCUMENTS

| | | | |
|---|---|---|---|
| 4,318,184 | 3/1982 | Millett et al. | 364/900 |
| 4,468,728 | 8/1984 | Wang | 364/200 |
| 4,611,298 | 9/1986 | Schuldt | 364/900 |
| 4,754,395 | 6/1988 | Weisshaar et al. | 364/200 |
| 4,799,156 | 1/1989 | Shavit et al. | 364/401 |
| 4,829,423 | 5/1989 | Tennant et al. | 364/200 |
| 4,839,853 | 6/1989 | Deerwester et al. | 364/900 |
| 4,967,381 | 10/1990 | Lane et al. | 364/551.01 |
| 5,041,967 | 8/1991 | Ephrath et al. | 364/200 |
| 5,115,504 | 5/1992 | Belove et al. | 395/600 |
| 5,241,671 | 8/1993 | Reed et al. | 395/600 |
| 5,257,185 | 10/1993 | Farley et al. | 364/419.19 |

*Primary Examiner*—Thomas G. Black
*Assistant Examiner*—Cheryl Lewis

[57] ABSTRACT

An apparatus and a method for an information management system are disclosed. The invention includes an Application Generator, the Distribution files generated by the Application Generator, and a Retrieval system which accesses the Distribution files. The Retrieval system uses data in the Distribution files to configure an Information System which runs stand-alone on a desktop computer. The information management system of the present invention uses an open hierarchical data structure for classifying information objects and providing a menu access to them. The open hierarchical data structure of the present invention includes multiple pathways to the same information object. Multiple paths can be used to support synonyms and to clarify word meanings within a context, thereby overcoming retrieval problems associated with conventional word matching technologies. The Application Generator also enables an author of an Information System to interactively link multimedia elements to information objects, and to customize the functional features and appearance of the Information System. The Distribution files include data related to the menu system and the configuration of the Information System, as well as data associated with the information objects. The Retrieval system guides an end-user to information objects in the Distribution files by generating successive selection menus in accordance with the open hierarchical data structure. Also disclosed is an embodiment of the invention that can be used to manage and distribute product information to buyers in the form of an electronic catalog. Buyers use the custom features of an Information System generated by the Application module to locate products, generate orders for the products, and transmit orders electronically to a vendor of the products. Product suppliers can also customize features in the electronic catalog to record the access path used by a buyer to create a product order.

30 Claims, 15 Drawing Sheets

METHOD AND APPARATUS FOR INFORMATION MANAGEMENT USING AN OPEN HIERARCHICAL DATA STRUCTURE

FIELD OF INVENTION

The present invention relates generally to information management systems, and more particularly to a system for building a stand-alone information system that uses a hierarchical data structure, and that is optimized for use with mass storage devices and desktop computers.

REFERENCES

U.S. Patent Documents

| | | | |
|---|---|---|---|
| 5,241,671 | 8/93 | Reed et al. | 395/600 |
| 5,115,504 | 5/92 | Belove et al. | 395/600 |
| 5,041,967 | 8/91 | Eprath et al. | 364/200 |
| 4,839,853 | 6/89 | Deerwester et al. | 364/900 |
| 4,829,423 | 5/89 | Tennant et al. | 364/200 |
| 4,611,298 | 9/86 | Schudt | 364/900 |
| 4,468,728 | 8/84 | Wang | 364/200 |
| 4,318,184 | 3/82 | Millett et al. | 364/900 |

Other Publications

Business Marketing Digest, "Are Electronic Catalogues A Viable Alternative?", Fourth Quarter 1990, Vol. 15, pp.71–80.

Carlson, Patricia. "Hypertext: A way of Incorporating User Feedback into Online Documentation" in *Text, ConText, and Hypertext*, edited by Edward Barrett, Cambridge, Mass.: MIT Press, 1989. p. 102

Davies, Roy. *Intelligent Information Systems—progress and prospects*, West Sussex, England: Ellis Horwood Ltd, 1986.

Fugman, Robert. "An interactive Classurus on the PC", *International Classification*, 17 (1990) No. 3/4, p. 133–137

Knox, Richard. "What in the World do they mean?—Science Prose mutating into unreadable jargon ", *Boston Globe*, May 11 1992, pp 25, 28–29.

Wood, Derrick. *Data Structures, Algorithms and Performance*, Reading, Mass.: Addison-Welsey, 1993.

Wurman, Richard Saul. *Information Anxiety*, New York, N.Y.: Bantan Books, 1990, pp. 49–50.

Deep Vent DNA Polymerase is a registered trademark of the New England BioLabs of Beverly, Mass.
ConQuest is a trademarh of ConQuest Software of Columbia, Md.

BACKGROUND OF THE INVENTION

Product suppliers have recently started to distribute product catalogs stored electronically on computer media, such as magnetic disks and CD-ROM. Technology-based vendors are particularly interested in electronic catalogs for a number of reasons. For example, the search capabilities of an electronic catalog provide a quick and efficient way to help technical buyers find exactly what they need. Also, existing technical products frequently undergo changes that must be promptly reflected in a catalog. New products must be added, and old ones must be removed, on a regular basis. Here again, electronic media are ideally suited to handle frequent updates and changes. Also, using computer media to periodically distribute large volumes of product information can be a cost-effective alternative to expensive printing costs and mailings.

A potential buyer simply loads the electronic catalog media into his or her computer, and uses retrieval software executed by the computer to locate product information, and to place orders. The prior electronic retrieval systems employ dedicated Hypertext applications, DBMS applications, text retrieval systems, and custom-built software systems.

Software engineers prefer custom-built retrieval systems for use as electronic product catalogs because custom-built systems provide better control over key system features that may not be well implemented in other existing retrieval systems, such as how a search is conducted and how memory is used on the end-user's computer. To build a compact and efficient retrieval engine, software engineers use simple, common database architectures that match an end-user's parameters with specially-built indexes of record attributes. This approach provides powerful retrieval features, such as boolean search capability, while also providing a stand-alone electronic catalog that can be used conveniently on an end-user's computer.

For a buyer, an electronic catalog can be extremely helpful, especially when there is a wide selection of products. An electronic catalog automatically narrows the search by matching a buyer's requirements to product features and specifications. And unlike most comparable retrieval systems that access a large volume of objects, noncomputer experts find the electronic catalogs extremely easy to use. In addition, electronic catalogs help streamline the commercial exchange between the buyer and the seller by automating purchasing activities.

There are also several known drawbacks to electronic catalogs. While they are extremely helpful to buyers who know exactly what they want, marketing experts question how useful they are to buyers who just want to browse. Custom-built electronic catalogs also have there own set of constraints such as the trade-off between the features and scope of the catalog and the impact of the catalog software on an end-user's computer. To minimize this impact the product data has to be specially formatted and all the internal routines are custom-built for the data. This makes the custom-built electronic catalogs expensive to build and maintain. Furthermore, each time a new catalog is needed for a different set of products, a computer expert has to build another custom software system.

As mass storage devices, such as CD-ROM, become more generally available on personal computers, more complex and detailed collections of information can be delivered, such as an electronic catalog, or a product directory. One key advantage of creating such a system using a CD-ROM is that a CD-ROM can easily handle the large volume of data required to represent product information in a variety of media formats including video and animation. CD-ROMs can also be used to distribute large volumes of detailed product information directly to a buyer, and the buyer can access the product information as needed. This approach would be particularly useful in delivering product information in a fast-paced technology market. In these markets the explosion of product information has saturated the paper-based media channels and has overwhelmed the buyer.

In the field of biotechnology another type of information problem occurs. Here the traditional channels for communicating marketing and product information simply cannot keep up with the rapid pace of product breakthroughs and new product releases. The timing of direct mail is always hit or miss. And when a prospective buyer is ready to review product material, frequently the necessary information cannot be found. Traditional paper-based catalogs are also problematic because the new catalog is always out of date. Even the "buyer's guides" are of limited use in this market because they do not provide the level of detail needed to differentiate one niche product from another.

The driving force behind the rapid product development in biotechnology is the scientist's preference to buy rather than build needed products. But ironically, as the industry releases more unique and diversified products, the scientist has no way of knowing which products are currently available, or who supplies them. Often, scientists must resort to searching online commercial databases such as Dialog, or STN International(®), the Scientific & Technical Information Network, to identify or locate product references cited in the research literature.

In this context an information service could distribute selected product information on computer media and bridge the gap between product suppliers and buyers. Such an information service would have to professionally manage the rapid flow of product information and provide a suitable method of accessing it. The information delivery system would have to be easy to use and provide the means to accurately locate, as well as browse, product information on any number of product specifications.

A long-standing obstacle to providing such an information service lies in the software technology that is used to organize and access large volumes of information. One problem with existing information management and retrieval systems is that they rely on word-matching retrieval technologies that are known to be inaccurate. Moreover, they are often difficult to use.

Improving Retrieval Systems with Menus

One common way to make an information management and retrieval system less difficult to use is to provide a menu system to guide an end-user. However, the effectiveness of such menu systems depends on how the menus are implemented, and where they are employed in the retrieval system. For example, a hierarchical menu system can only help an end-user when all of its menu entries are familiar and easily understood by the end-user. Some architects of menu systems respond to this issue by enabling the end-user to replace a menu entry with one that uses more familiar words, or by customizing a menu path (U.S. Pat. No. 5,041,967 by Eprath et al. in August 1991). However, this approach is not practical for use in an information system where the data and the access paths associated with the data change frequently.

Menu systems are typically used to help end-users with complex or hard-to-use retrieval systems like relational databases. In this type of environment, the menu system must be carefully engineered to perform each and every supported retrieval request. Often, such menu systems cannot handle some requests which the underlying retrieval system could easily perform. In this instance, the menu system conceals the underlying retrieval technology, and therefore limits an end-user's ability to make maximum use of the underlying retrieval system.

In addition, some retrieval engines intentionally use menu systems to restrict the end-user's access to a more powerful or complex underlying technology. For instance, menu systems are used with natural language systems that can be programmed to search databases using requests made in everyday language. Since, it is well-known that subtle differences in the wording of a request can result in dramatically different results, and to avoid problems with ambiguous queries, some natural language systems use menus to control the access vocabulary and thereby eliminate any unexpected results (U.S. Pat. No. 4,829,423 by Tennant et al in May 1989). However, such a menu system adds significantly to the maintenance of the retrieval system. Each time the database structure is changed, the menu system also has to be adapted to conform to the new structure.

Problems with Word Matching

Known retrieval systems also suffer from word usage problems which are inherent in the English language. This includes problems with polysemy, where a word has more than one distinct meaning (e.g. "table" as a matrix of data versus a "table" as a piece of furniture). It also includes problems with synonymy, where many distinct words have the same meaning (e.g., "car" and "automobile").

To locate information in a text-based retrieval system, word matching technologies match a search word with a word in its database or in its index of words associated with a document. A problem occurs when a user's intended meaning of a search word differs from an author's meaning of the same word when a retrieval task is performed. This mismatch of word meanings often produces a retrieval result that is missing relevant references, or that includes numerous irrelevant references.

A related problem is that in some research fields, particularly science and technology, word meanings have become highly specialized. In some cases, specialized databases systems can only be used by experts who understand how words are used within their own narrow discipline. This has created an additional barrier to information access which impedes interdisciplinary efforts.

A further problem with present text-based retrieval systems known to the research community is that researchers in different fields use different names to describe the same objects or phenomena, the problem of synonomy. This means that some scientific discoveries may go unnoticed, simply because their published reports use terminology different from that used by another discipline.

One approach to these problems is to have experts act as intermediaries for producing search words and maintaining indices of related key words. Another approach is to build and maintain a thesaurus for providing word associations and synonyms to broaden searches. Typically, these approaches are implemented by providers of large volumes of public information in the nonprofit and government sectors. However, these approaches are labor intensive and expensive to build, and they have yielded only mixed results due to the size and scope of the domain.

The expense of using intermediaries to build indexes for large information systems is a well known economic disadvantage. In fact, computer scientists are reluctant to develop any retrieval technologies which do not rely heavily on automated methods. The most successful recent advances in retrieval technology all focus on improving the accuracy of word-matching technologies. However, there is a growing volume of time critical information that simply can not be served by this technology. The situation has created an unmet need for highly detailed access and browsing capabilities to certain types of information like technical product descriptions.

Revisiting the Tree Structure

There are many benefits to conducting a search using a tree structure. The search data is compact and the retrieval technology uses storage memory in a highly efficient manner. For example, the link to a data object is stored in the same data structure that is used to create the menu system for a search. When an author adds a new data object to a tree, he or she automatically provides a programmed menu access to the new data object. And lastly, a tree structure nicely displays the organization of the data it interrelates.

The menu system created from data in the search tree also has advantages in its own right, especially when it is presented in a graphical user interface. The combination of the interface and the tree structure makes the resulting menu dialog easy to use and understand. And unlike retrieval interfaces based on user-supplied values, the menu system always generates a complete list of search parameters or choices at each and every decision point in the path through the tree. This eliminates the need to experiment and test a number of search words that could account for differences in word usage. And finally, organizing data in a tree structure and using a menu-driven interface to access the tree structure is an excellent way to guide a naive end-user.

Historically, the primary function of a tree data structure has been to store objects under an appropriate hierarchy of categories. The tree's role as a storage technique nicely lends itself to an efficient retrieval technology. However, the structure of the classification system used by the search tree to store objects is rigid and limits the search tree's retrieval capabilities to mutually exclusive paths. The tree structure can not provide alternative ways of looking up the same object.

Hierarchical information trees were first introduced to manage large collections of data because they were more efficient than known approaches, such as linked lists (U.S. Pat. No. 4,318,184 by Millett et al. in March 1982). Other approaches used for managing large amounts of data include using a data structure arranged into a plurality of search trees so as to reduce disc seeks and improve the performance of searches on mini-computers (U.S. Pat. No. 4,468,728 by Wang in August 1984). More recently, hierarchical information trees were used on small computers to implement database capabilities as extensive as those found on the largest computers of the day (U.S. Pat. No. 4,611,298 by Schudt in August 1986). However, in all these cases the overlapping categories cannot be represented, nor can problems with synonymy be overcome.

Most recently, information trees have been used as data structures to provide overviews to more complex retrieval systems, such as hypertext webs. Tree data structures are also used to implement tables of contents, help menus, and spatial maps of files and directories. The tree structure is well suited to handle all of these types of applications because it provides a known model for data which already has a hierarchical structure. However, within each level of the hierarchy, each category or grouping of objects can only classify objects that do not overlap with other categories.

Searches on Non-Exclusive Categories

Prior approaches to implementing searches on non-exclusive categories in large collections of information involve substantially more complex approaches. These include semantic nets, expert systems, and improvements to retrieval systems by using a latent semantic structure approach (U.S. Pat. No. 4,839,853 by Deerwester in June 1989). All of these methods were designed to overcome the limitations of word matching retrieval systems, which have known problems with synonymy and overlapping categories as previously discussed. However, all of these methods are impractical for use on an end-user's computer because they require large amounts of memory and computing resources.

Attempts to organize and store objects in non-exclusive groupings for use in a desktop computer include a database system that employing a link structure that enables an object to belong to one or more categories (U.S. Pat. No. 5,115,504 by Belove in May 1992). Unfortunately, systems such as this are limited in capacity to relatively small collections of data.

In a desktop computer, larger collections of information are typically stored on computer media like CD-ROM. The information in these collections often includes unrestricted text files, called document objects, that are likely to contain information relevant to an end-user. An end-user accesses the document objects with a text retrieval engine that matches user-supplied search words with words found in the document object. As discussed earlier, the results of word matching technologies are far from exact.

Recent advances in retrieval technology include software systems that have been developed to improve the accuracy of the text-based systems. For instance, to help the end-user efficiently sort through the results of a text-based search, concept retrieval engines rank document objects according to a knowledge base of user-defined relevance. To broaden a search request so that relevant information is not missed, ConQuest™, a patent-pending retrieval system, includes a preprogrammed knowledge base that adapts to common variations in everyday word usage and meaning. Here, the knowledge base uses a semantic network of words, word meanings, and word relationships, to overcome problems with word synonymy and overlapping categories. However, neither one of these advanced retrieval systems can provide browsing capabilities to an the end-user.

Another approach for accessing data stored on CD-ROM uses a custom-built database that addresses multimedia information objects (U.S. Pat. No. 5,241,671 by Reed et al. in August 1993). To facilitate access to objects, this system provides multiple textual and graphic entry paths into its database. The textual entry paths employ word matching technologies. To overcome problems with user-supplied search parameters, the system includes a dictionary function that verifies spellings, and a thesaurus that helps the end-user identify unambiguous search terms.

Another mode of access in the system discussed above uses a topic tree that allows an end-user to browse the contents of the database by selecting topics and sub-topics in the topic tree. However, the topics are very broad and general. The topic tree cannot provide the level of detail or the versatility that one would typically find in an index in the back of a standard book. In a book index there are cross references and multiple access paths that classify and associate terms used to locate an object. In this respect, the browsing capabilities of the topic tree are limited in scope to an "table of contents".

OBJECTS AND ADVANTAGES

It is a general object of the present invention to provide a method and apparatus for information management that significantly overcomes the limitations of the prior art.

One object of the present invention is to provide a stand-alone information system that is easy to use.

Another object of the present invention is to provide an information management system that can create a compact, stand-alone information system that is convenient to run on small computers.

An additional object of the present invention is to provide an information management system that can customize the appearance and features of the standalone information system it creates.

Another object of the present invention is to provide the means to create a stand-alone information system which is optimized to utilize mass storage devices like CD-ROM drives.

An additional object of the present invention is to provide an author of a stand-alone information system with an easy-to-use means of building a menu system of the stand-alone information system which provides direct access to information objects.

Another object of the present invention is to provide an end-user of the stand-alone information system with a highly accurate retrieval capability.

Another object of the present invention is to encourage end-users to browse through a collection of information.

Another object of the present invention is to enable an author of a stand-alone information system to interactively build and maintain a hierarchical information structure which can be used to store and retrieve objects in the information management system and in the stand-alone information system produced thereby.

Another object of the present invention is to eliminate software restrictions on the depth of a hierarchical information structure.

Another object of the present invention is to enable multiple descriptions, attributes, or wordings to be associated with a given information object.

Another object of the present invention is to support both mutually exclusive and non-exclusive access paths to information objects.

Another object of the present invention is to manage and distribute product information by delivering product information to buyers on computer media, and to automatic the process of locating products and generating product orders.

Other objects of the present invention will in part be suggested and will in part appear hereinafter. The invention accordingly comprises the apparatus possessing the construction, combination of elements, and arrangement of parts, and the methods involving the several steps, and the relation and order of one or more of such steps with respect to others, all of which are exemplified in the following detailed disclosure, and which are indicated in the claims.

SUMMARY OF THE INVENTION

The objects of the invention are attained by providing an information management system that employs an open hierarchical data structure to organize and retrieve data objects in a database. The information management system of the invention enables a user to create a customized information system that runs stand-alone on an end-user's computer. The invention includes an Application Generator, a Retrieval module, and the Distribution files that include data for the target information system. The Application Generator is used to build a database embodies by the Distribution Files. The Retrieval module is used to access the Distribution Files. Both systems include graphical user interfaces to facilitate ease-of-use.

Information in the invention database is organized according to an open hierarchical data structure that also forms the basis of the menu system. The present invention enables an author to create multiple paths to the same information object in the open hierarchical data structure. Here, each path can represent an alternative menu access to the same information object.

At the end of each path in the open hierarchical data structure there are one or more pointers to the media elements which make up the information object. Each internal node of the open hierarchical data structure, i.e., nodes not disposed at the end of a path, corresponds to a category or subset of the information objects, namely those objects found at the end of paths that traverse that node. An author assigns one or more elements to each internal node to create a display for a menu entry corresponding to the category.

There is no limit on the depth of the open hierarchical data structure. Thus the hierarchy can be as deep as the author requires. Consequently, the Application Generator of the invention enables an author to incorporate any number of levels in the hierarchy, thereby providing more detail and accuracy to a search. This ability to create successive selection information at any level of depth is referred to the deep index.

The multiple paths to the objects in the open hierarchical data structure provide a highly versatile classification system and facilitate retrieval, even when the search involves variations in word usage and overlapping classification schemes. The multiple paths in the data structure of the present invention also enable an author to represent conceptual associations and relationships among groups of terms like a thesaurus.

In fact, an author of an open hierarchical data structure in the present invention can implement whatever hierarchy he or she prefers. For instance, the hierarchy could be a hierarchical taxonomy of objects, or it could be an entirely different type of hierarchy, such as a decision tree composed of questions, a delineation of goal-directed objectives, or a rule-based expert system. The present invention provides this flexibility by eliminating restrictions on what can be used as an entry in a selection menu, by supporting multiple paths to an object, and by storing information about selections made by the end-user. These features create the framework for a hierarchical shell which can be customized in a variety of ways. The result is a very flexible menu system which can easily be tailored to meet the needs of the end-user.

Customized Information Systems

An author of a stand-alone information system uses the Application Generator to assemble information objects and interrelate them according to the organization of the open hierarchical data structure. When all of the information objects have been entered into the system, the author uses the Application Generator to produce the specially formatted Distribution files which store the open hierarchical data structure, configuration data for the Information System, and the data for the information objects. These files are distributed with a standard copy of the Retrieval module, thereby providing a stand-alone Information System that can be executed on an end-user's desktop computer.

An important feature of the present invention is that it produces an Information System which is configured dynamically on the end-user's computer. This enables an author to customize features for each application he or she creates. The custom features include not only the types of searches that can be performed by an end-user, and the appearance of the screens and menus, but also what particular information is saved when an end-user makes a selection at an object screen. This broadens the usefulness of the present invention whereby Information Systems can be configured to help end-users complete lengthy or complicated forms, produce simple documents, create checklists, or generate product orders.

Improving Menu Access

The end-user executes the Retrieval module to produce the menu system that is used to navigate the open hierarchical data structure, and access data associated with the information objects. The end-user explores the hierarchy in a natural way, moving up or down the structure, at any point selecting from one of the nodes at the current level or from one of the levels previously visited. For each level visited, a window displays all of the nodes corresponding to that level and a new menu displays the nodes at the next level pointed to by the node selected by the end-user. The windows remain on the screen as successive windows overlap each other left to right.

Each internal node in the open hierarchical data structure has a pointer that either points to an information object, or to a node at another level of the structure. Each node can also have a second pointer that points to another node at the same level to create a sibling list. A sibling list can represent a list of words. Thus each node can point to a list. Thus the open hierarchical data structure serves as an index that organizes and facilitates access to the information associated with the information objects.

The present invention enables the "index" it creates to extend downward into an unlimited number of sublevels, in contrast to the index commonly found in a book, where the number of sublevels in the index is limited by the physical layout of the page. All lists are presented to the end-user on a computer screen in scrolling regions of a selection menu. The successive lists simply overlap the most recently presented. Thus, the invention provides an intuitive and flexible menu interface for accessing a complex body of information.

The menu-driven exploration of the open hierarchical data structure of the invention is superior to known methods of search in several ways. On large information systems which use databases or full text retrieval systems, end-users are required to supply search parameters. In contrast, the present invention always prompts the end-user with a complete menu of search options, thereby guiding the end-user to the next level of detail in the open hierarchical data structure until the required data object is reached. If an incorrect selection is made by the end-user, it is easily corrected by backing up in the menu hierarchy and reselecting a more appropriate option. From the end-user's perspective, the successive presentation of selection options not only helps the end-user to understand the ordering of the data, but also provides a systematic and controlled way of navigating through an unfamiliar collection of information to discover its contents.

In addition, the menu-driven user interface obviates the need for a user to remember obscure nomenclature or keywords. Furthermore, highly specialized words are only used in context, whereby their exact meaning is clarified. The present invention overcomes problems in the prior art relating to different nomenclature that relates to the same phenomena or data, by providing an open hierarchical structure data that supports multiple paths to the same object. More generally, the information structure of the invention can represent categories at each level of a hierarchy that are not mutually exclusive.

An Information Tool

The present invention provides a general purpose information management system for creating specialized collections of information to be distributed for access on desktop computers. An important advantage of the present invention is that its menu system includes more detail about each object in the collection than existing systems. Also, the menu system guides end-users directly to each object. The added detail in the menu system improves the precision and accuracy of information gathering and, in addition, provides a convenient way for an end-user to browse the contents of an information system.

Information brokers or domain experts can use the present invention to build and distribute information delivery products. These products can be customized for specific end-user markets and used as an effective alternative to searchers on large commercial database systems. For instance, the present invention can be used by an information service to repackage public information found on several large government or commercial on-line databases. It can also be used to collect and manage other types of information, such as an electronic product index or directory, such as the example application presented in this disclosure. In any case, the finished product, a stand-alone information delivery and access system, adds value to the information by collecting it together in one place, organizing it, and providing a custom-built end-user interface for accessing the organized information.

In contrast to existing retrieval technologies including DBMS applications, custom-built DBMS systems, Hypertext, Search Trees, and Text-based systems the present invention has a unique combination of three definitive characteristics. First, access to objects relies exclusively on a highly versatile, hierarchical menu system. Second, the hierarchical menu system provides multiple access paths to the same object. And third, in the preferred embodiment of the present invention the number of disk seeks required to locate an object is optimized for data on mass storage devices.

Each of the known existing retrieval systems has one or two of these characteristics but never all three. For instance, the hierarchical menu in a search tree retrieval technology cannot provide multiple paths to the same object. In Hypertext systems the primary method of access relies on a network model. However, in some instances, a hierarchical access is added to the system to augment the network access and improve end-user navigation. And, text-based retrieval systems always rely on user-supplied parameters to locate objects; there are no interactive menu paths to guide an end-user to an object.

Lastly, DBMS architectures depend upon frequent disk access and disk seeks to locate objects in its database. On mass storage devices like CD-ROM these activities have a negative affect on response time and performance. In conclusion, the preferred embodiment of the present invention alone uses the combination of these three definitive characteristics to overcome the limitations of existing retrieval technologies.

Distinct Advantages

The present invention also has numerous other characteristics and advantages. For instance, the retrieval engine used in the invention is compact and the stand-alone Information System employing the retrieval engine uses only a modest portion of the resources of the end-user's desktop computer. The present invention also takes advantage of the latest technological advances made on these desktop computers including user interfaces, multimedia devices used to display and/or broadcast information, and software development tools used to deploy computer systems on a wide range of hardware and software environments.

In the example Information System disclosed here, a molecular biology index was created by biologists, molecular biologists, and chemists. Each expert had to review the other's contribution to insure that the wording in the menu topics reflected each discipline's preferred way of describing the information. The present invention is specifically intended to be used in such a collaborative fashion by inexperienced computer users. One does not need extensive technical training to create an open hierarchical data structure or build an Information System. The primary objective of the present invention is to enable experts in any field to transfer their knowledge, without being distracted by the technology that facilitates the knowledge transfer process.

An Electronic Catalog

The Information System of the invention enables product suppliers to deliver product information, announcements, and promotions directly to a buyer's computer. The buyer, in turn, can retrieve any of this information on demand, making the present invention a more efficient alternative to known methods of marketing communications such as direct mail, advertising, or press releases. To facilitate access to product information in the present invention, the information is available on demand and it is encoded in a variety of media. Furthermore, searches can be performed on any number of detailed specifications, and browsing is encouraged by contextual cues and graphical images. And the present invention supports multiple ways of conducting a search to ensure that differences in word usage do not impede access to a product.

An important advantage of the present invention as an electronic catalog is that an author can create any number of paths in a menu system to respond to target segments in the end-user audience. And more importantly, the electronic catalog of the present invention can be configured to track menu selections made by an end-user. Thus the Information System, as well as, the menu system are interactive. Menu selections made by an end-user can provide an product supplier with valuable marketing information about their customers. In turn this information can help a product supplier construct a profile of their customer base.

Advances in technology have accelerated all aspects of product development, and now it is generally understood that it takes considerably less time to bring a new product to market. One embodiment of the present invention exploits recent technical advances in desktop computers. An alternative embodiment of the present invention provides an extremely efficient use of computing resources and data transfer capabilities in a large, open network environment. In all cases the software technology of the present invention can be engineered to take advantage of advances made in the hardware that is used to deliver information. The goal is to provide a means for distributing new product information that can keep pace with the acceleration of new product development. One of the major benefits of the present invention is that it reduces the time it takes for a buyer and seller to communicate with each other by automating the management of the information exchange.

BRIEF DESCRIPTION OF THE DRAWINGS

The following detailed description of the preferred embodiments of the invention can be better understood when read in conjunction with the following figures, in which:

FIG. 2 is a schematic block diagram of the files associated with the application generator and the retrieval module of FIG. 1, and the information flow there between;

DETAILED DESCRIPTION OF THE PREFERRED EMBODIMENTS

The present invention provides a general purpose information management system that can be used to build customized information systems. The Information System created by the present invention can be used to distribute information relating to a wide range of subject matter. For instance, the invention can be used in the medical field to facilitate distribution of and access to clinical information on pharmaceutical products, public health policy guidelines, and emergency triage information.

To facilitate a description of a preferred embodiment of the invention, and to further illustrate the utility of the present invention, an example will be drawn from a direct marketing service which periodically distributes computer media that contain the most up-to-date and time critical product information on molecular biology tools and supplies. The service uses the present invention to collect and manage product information, and to build an electronic catalog, i.e. an Information System, that can be executed on a buyer's computer.

The Application Generator organizes information objects into a classification scheme which is meaningful to the end-user, and creates and manages a wide variety of media elements used to deliver product information such as text, images, sound tracks, and video.

The figures used to describe the Application Generator refer to the features of the Application Generator in the most general way. To further illustrate the utility of the present invention, an embodiment of an Information System built by the present invention will be discussed, i.e., an electronic catalog that enables an end-user to locate products listed in the Information System, and to generate product orders. The figures used to help describe the electronic catalog refer to a particular embodiment of an Information System created by the Application Generator. The invention is not limited to the particular embodiment of the Information System discussed, and is not limited to the explicit set of features chosen by the particular author, but includes any combination of Information System features which can be produced by the Application Generator.

It is therefore useful to begin with a general description of the apparatus and method of the present invention, realizing that the principles and concepts embodied in this description may be adapted to many different useful applications.

Figure 1:
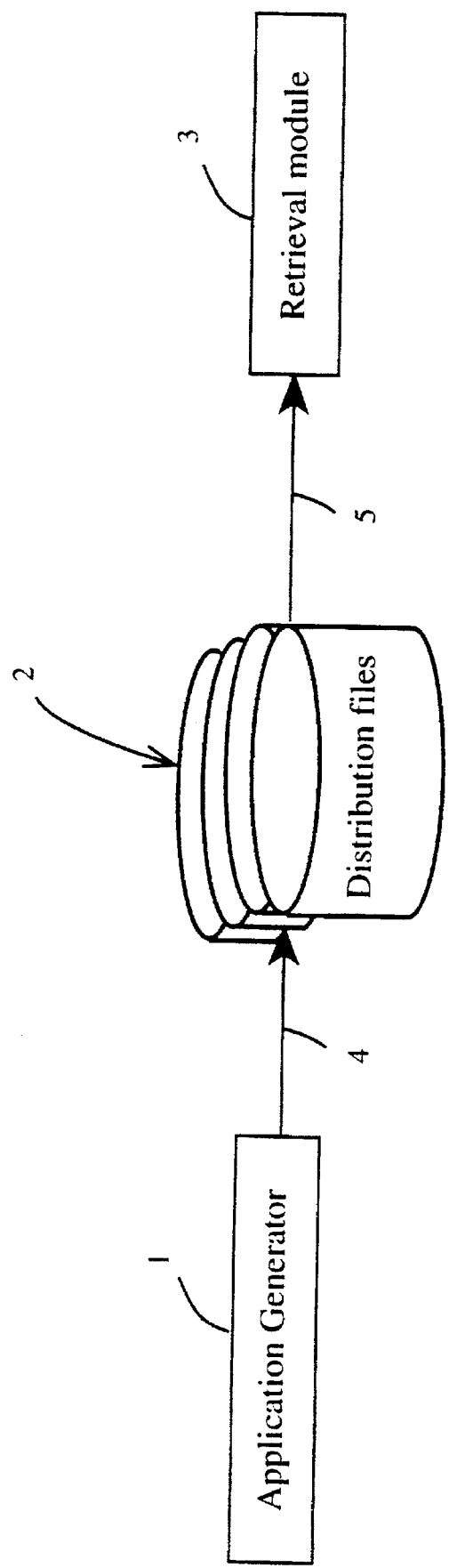
FIG. 1 is a schematic block diagram showing an overview of the main software components of the information management system, and information flow between the components.
Figure 4:
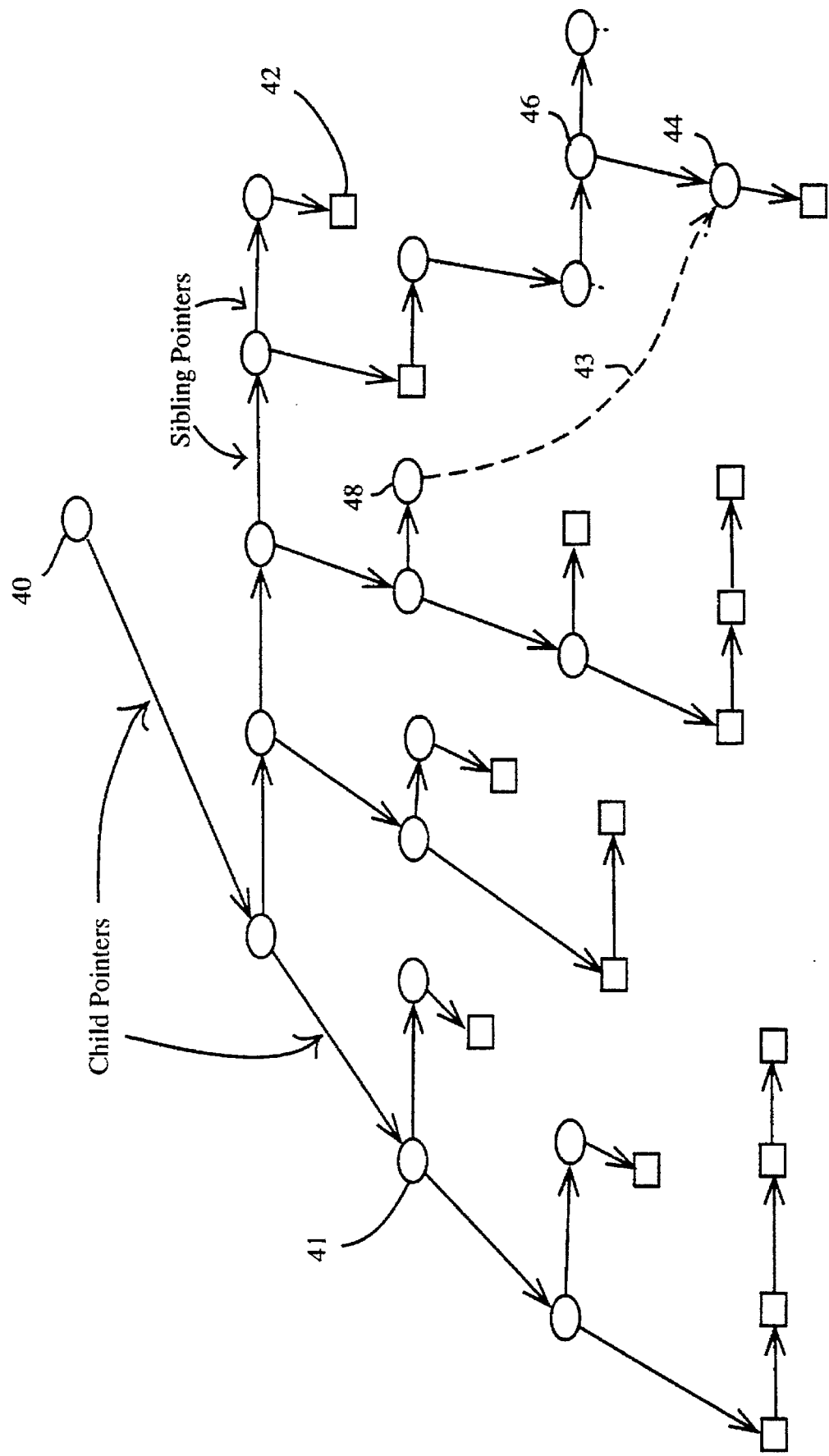
FIG. 4 is a graphical representation of an open hierarchical data structure used in the invention.

Referring to FIG. 1, a general overview of the main software components of the present invention is shown. An Application Generator 1 includes means for building the specially formatted files that store the information objects and the data that is used by the Retrieval module 3 to configure a stand-alone Information System. Typically, the author of such an Information System is a vendor, or an expert in a subject area often referred to as a domain expert. An author uses the Application Generator 1 to interactively build an open hierarchical data structure, as shown in FIG. 4, discussed below, and to import and link information objects it the open hierarchical data structure.

The Application Generator 1 outputs the open hierarchical data structure and its associated objects to a set of specially formatted files called the Distribution files 2. The Application Generator I has write-only access 4 to these files. Each set of Distribution files 2 includes a menu file, a configuration file, and one or more data files which store information objects.

A Retrieval module 3 is installed on an end-user's computer along with the Distribution files 2 to provide the means to locate information objects in the Distribution files 2. The Retrieval module 3 does this by generating selection menus from data in the menu file. The menus guide an end-user to an information object. When an object is reached, the Retrieval module 3 fetches the media elements associated with an information object from the object data files and displays the object to an end-user in an object window. The Retrieval module 3 has read-only access 5 to the Distribution files 2.

The Distribution files 2 are also used to program the Retrieval module 3 to deliver special features in the Information System. In the disclosed example, an electronic catalog includes the ability to generate product orders, store them, and electronically transmit them to a supplier. These features are described in detail in FIG. 14 and FIG. 15.

The preferred embodiment of the present invention employs a procedural computer language to provide an Application Generator 1 and Retrieval module 3. Alternative embodiments of these modules could be implemented in a non procedural language like a database application language where routines are programmed to perform the functions of the Application Generator 1 and/or the Retrieval module 3. The alternative embodiment of these modules uses database tables to create and manage the open hierarchical data structure and the related information objects. The decision to use the alternative embodiment employing a non-procedural computer language is based on the amount of memory available for the database engine on the host and/or target computer as well as the response rate of the storage device. Thus, the present invention can be implemented using a procedural or a non-procedural computer language.

Figure 2:
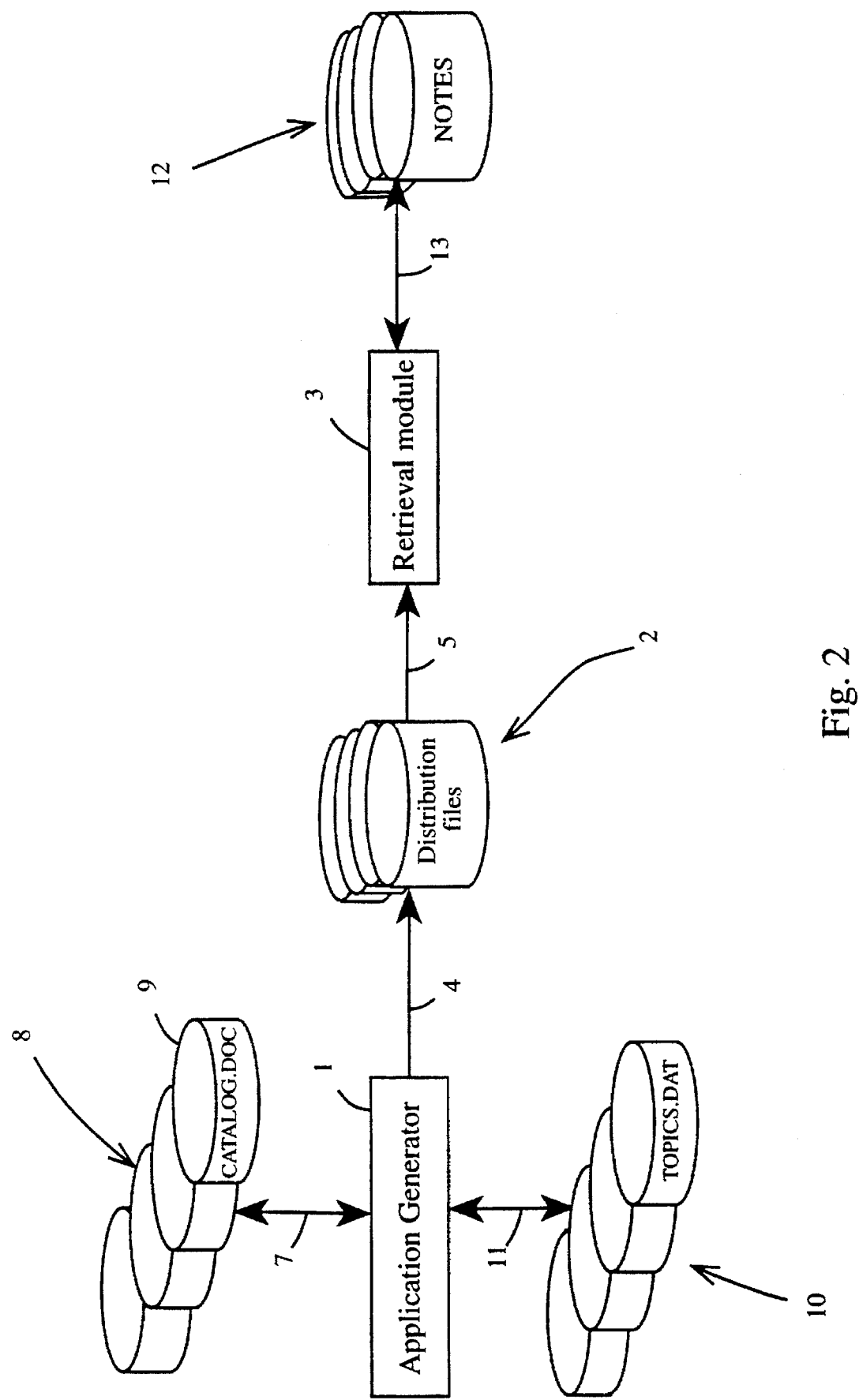

FIG. 2 shows the sets of the files used by the Application Generator 1 and the Retrieval module 3. In addition to the Distribution files 2, FIG. 2 also shows the input files 8 and the work files 10 used by the Application Generator 1 and the end-user files 12 created and maintained by the Retrieval module 3.

The Application Generator 1 maintains a database of all the parts of the Information System as well as the information tools needed to manage them. A brief inventory of the parts of an Information System includes: the menu paths of the open hierarchical data structure, the links between the information objects and the open hierarchical data structure, and one or more media elements that make up each information object.

A media element can be any natural unit of information such as a block of text, an audio clip, or a bit-mapped image that is stored in a machine-readable file. In the example electronic catalog disclosed herein, the input is drawn from catalog document files and output from a product database. An author tags a media element in input file 9 and imports it directly into the work files 10 (see FIG. 9a for details). The Application Generator 1 has read/write access 7 to the set of input files 8 and read/write access 11 to its own work files 10. When the Application Generator 1 creates the Distribution files 2 it compiles address information for each media element in the collection based on the data in the work files 10 (see FIGS. 9b & 9c for details).

The Retrieval module 3 also creates and manages its own set of files, the end-user files 12, on a buyer's computer. It has read/write access 13 over these files. This includes a file that stores comments and observations about an object in the Information System and another file that stores bookmarks on object screens and menu locations.

The Retrieval module 3 also creates and maintains end-user files 12 to support special features that have been programmed into the Information System by an author. This includes a file for the password system and a file for the database used by the Information System to store and report on objects selected by the end-user.

Figure 3:
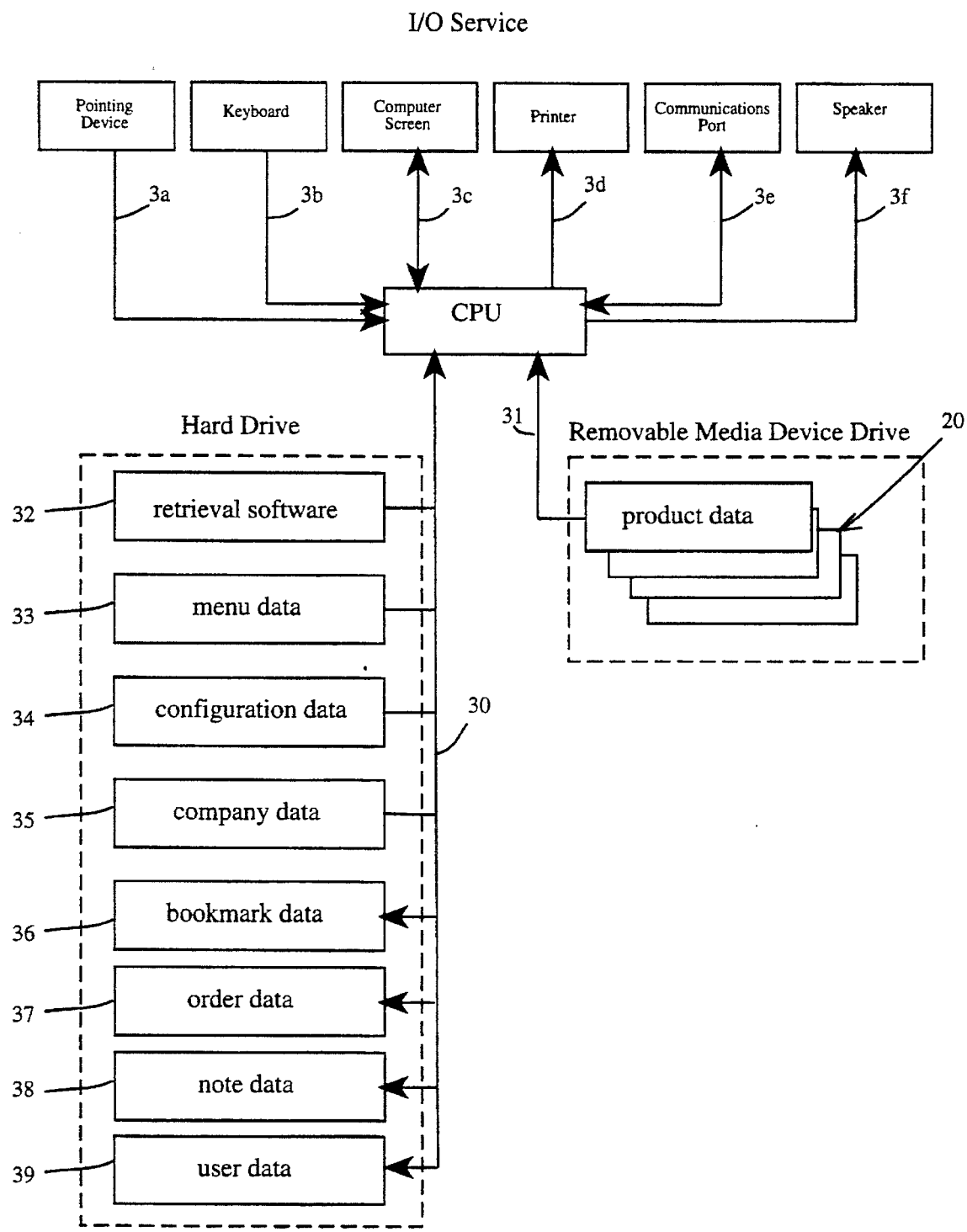
FIG. 3 is a schematic block diagram of the CPU, memory, input and output devices, the location of files used by the Retrieval module, and the information flow between the files and the input and output devices.

FIG. 3 depicts a typical end-user computer system that could be used for the method of the disclosed embodiment of the electronic catalog. The computer includes a central processing unit (CPU) which is electronically coupled (as schematically represented by lines 3a through 3f) to input and output apparatus designated by a pointing device, a keyboard, a computer screen, a printer, a communications port, and speakers; by line 30 to a hard drive device; and by line 31 to a removable media device drive.

The software components of the present invention are engineered to run on any computer. This includes operating systems on small computers like DOS, Windows NT, OS/2, UNIX, and the Macintosh. The internal architecture of the present invention uses an event-driven design. When a graphical user interface (GUI) is available the Application Generator 1 and the Retrieval module 3 use the host GUI services or the modules generates their own menus and dialogue boxes to look like the host GUI display. The present invention does not require any special graphics capabilities. In DOS text mode the present invention simulates a graphical user interface with character-based menus.

The command interface for the present invention uses pull-down menus displayed across the top of a screen. The pull-down menus in turn use selection menus and dialog boxes to collect input from the user. User input to the system is given through a pointing device, like a mouse or light pen, and/or a conventional keyboard. The end-user issues commands to the system by placing the cursor on a command button or on an entry in a menu selection and clicking on it. If a pointing device is not available the arrow keys on a conventional keyboard can be used to move the cursor to the appropriate command region or menu entry. The Enter key activates a command and an Escape key deactivates a window.

The Application Generator 1 can configure the Distribution files 2 for any number of computer media and target operating system environments. For some collections of information, all of the Distribution files 2 including the installation procedures and the Retrieval module 3 executable image can be delivered to an end-user on a single computer media like a CD-ROM disc. For other collections, the Application Generator 1 can configure the Distribution files 2 to the storage capacity of the target media whereby the end-user receives a set of computer media like a set of numbered floppy diskettes.

The file configuration depicted in FIG. 3 represents an embodiment of the disclosed electronic catalog that can distributed on a set of floppy diskettes. In this embodiment each diskette stores a group of related product data files 20. When the end-user locates a product object in the menu system, the Retrieval module 3 fetches the object's address from the menu data file 33 and prompts the end-user to install the relevant disk in drive 31. By separating the search data from the product data the present invention eliminates the requirement to install product data on the end-user's hard drive.

The present invention also separates media elements into different types of data files depending upon the type of relationship the media element has to the information object. If the same media element is related to more then one object the media element is stored in a separate file that is installed on the hard drive 30 like the company dam file 35. This approach makes efficient use of the computer's fast memory and saves storage space by eliminating redundant data.

In the configuration depicted in FIG. 3 the executable image of the retrieval software 32, the menu data file 33, and the configuration data file 34 are installed directly on the end-user's hard drive. The configuration data file 34 stores data on the features of the Information System, the layout of its screens and windows, and data used to create and maintain any internal databases used by the system.

The end-user files 12 used by the Retrieval module 3 all reside on the hard drive 30. This includes the bookmark data file 36 and the note data file 38. It also includes the user data file 39 for the password system and the order data file 37 that is used to store and retrieve product orders.

The password control system enables an end-user to prevent unauthorized access to features in the system. In a multi-user environment this feature enables group members to share common information. The password system stores encrypted information on registered user names, passwords, and associated privileges in the user data file 39.

Output devices used by the present invention include communication ports to fax orders or copy order files to a supplier's site; speakers for digitally recorded audio information; a monitor to display graphics, images, and pictures; and printers for generating hardcopy. To accommodate the widest possible range of monitor displays, the Application Generator 1 and Retrieval module 3 configure their screen size and display environment at run time based on the host settings.

Alternative embodiments of the Retrieval module 3 include configurations where some of the functional components of the module are installed and executed on an end-user computer and others are executed on a remote computer. In this alternative embodiment the Distribution files 2 are installed on a remote computer. A component of the Retrieval module 3 on an end-user computer generates the selection menus and dispatches requests to the remote computer for data stored at its site. The remote computer processes requests made by an end-user computer, fetches data from its files, packages the data, and then sends the data packages to the end-user computer. The end-user computer receives these data packages and executes components of the Retrieval module 3 to display the screens, menus, and objects in the Information System. This alternative embodiment of the Retrieval module 3 provides a highly efficient means for delivering information on demand in network environments.

FIG. 4 depicts a graphical representation of the open hierarchical data structure used in the present invention. A search begins with a single branching node that is known as a root (branching) node 40. The search then progresses through one or more branching nodes, like branching node 41, to a final node in a path, like dam node 42.

The data node stores one or more pointers to media elements in the data files that make up the information object.

Each branching node in the structure has an information key which is used to represent the category or class of objects corresponding to that point in the hierarchy. In the menu system the information key is displayed as an entry in a selection menu. By definition each branching node also has a single child pointer to a successor node in the structure. The child pointer is used by the Retrieval module 3 to fetch the next menu level.

Branching and data nodes can also have a sibling pointer which is used to create a sibling list. The nodes in a sibling list have the same parent and are ordered either alphabetically by default or arbitrarily by the author. The sibling list is used by the Application Generator 1 and the Retrieval module 3 to keep track of the set of choices in a selection menu and their order of appearance.

Unlike a search tree, the open hierarchical data structure used in the present invention is designed to support multiple paths to the same node or information object. One way it does this is by allowing a child pointer like 43 in FIG. 4 to point to any node in the structure. When a successor node like 44 already has a parent 46, the additional pointer to it imposes a new set of relationships. The successor node 44 is called a stepchild of node 48. Node 48 is a stepparent of node 44, and node 46 is a primary parent of node 44. Thereby node 44 can reached by two different paths.

The stepparent/child link 43 was designed specifically to overcome known retrieval problems with synonymy. It can also be used to overcome more subtle problems encountered with word usage such as end-user perceptions of equivalence, shifting patterns in word usage, overlapping meaning, and near equivalence in technical areas. The solution presented here—multiple pathways to the same object—enables an author to use each path to represent an alternative way of locating the same object. In turn this capability also enables the author to qualify each menu entry within its context, the menu path, in order to eliminate ambiguous interpretations and thereby overcome problems with polysemy.

This feature also enables authors to design more effective menus for end-users. For example, a stepchild pointer can be used to provide shortcuts within more lengthy menu paths.

Or a stepchild pointer can be used to implement a cross reference feature in a selection menu. For instance, a "Cross Reference" entry in a selection menu could point to a selection menu of related topics which in turn uses stepchild pointers to link to the actual topics found in other parts of the menu system.

The Application Generator 1 also helps an author to design a menu system by providing detailed reports and maps on all menu paths in the open hierarchical data structure. The reporting features are part of the Diagnostics command 117 which is described in FIG. 11. When an object can be reached by multiple paths the Application Generator 1 lists each path in sorted order by the number of branching nodes in each path. The tree structure formed by solid lines in FIG. 4 is the central reference point for each path. The reporting features are particularly useful to authors who need to build and manage a complex menu system that has been customized for a variety of different types of end-users.

Figure 5:
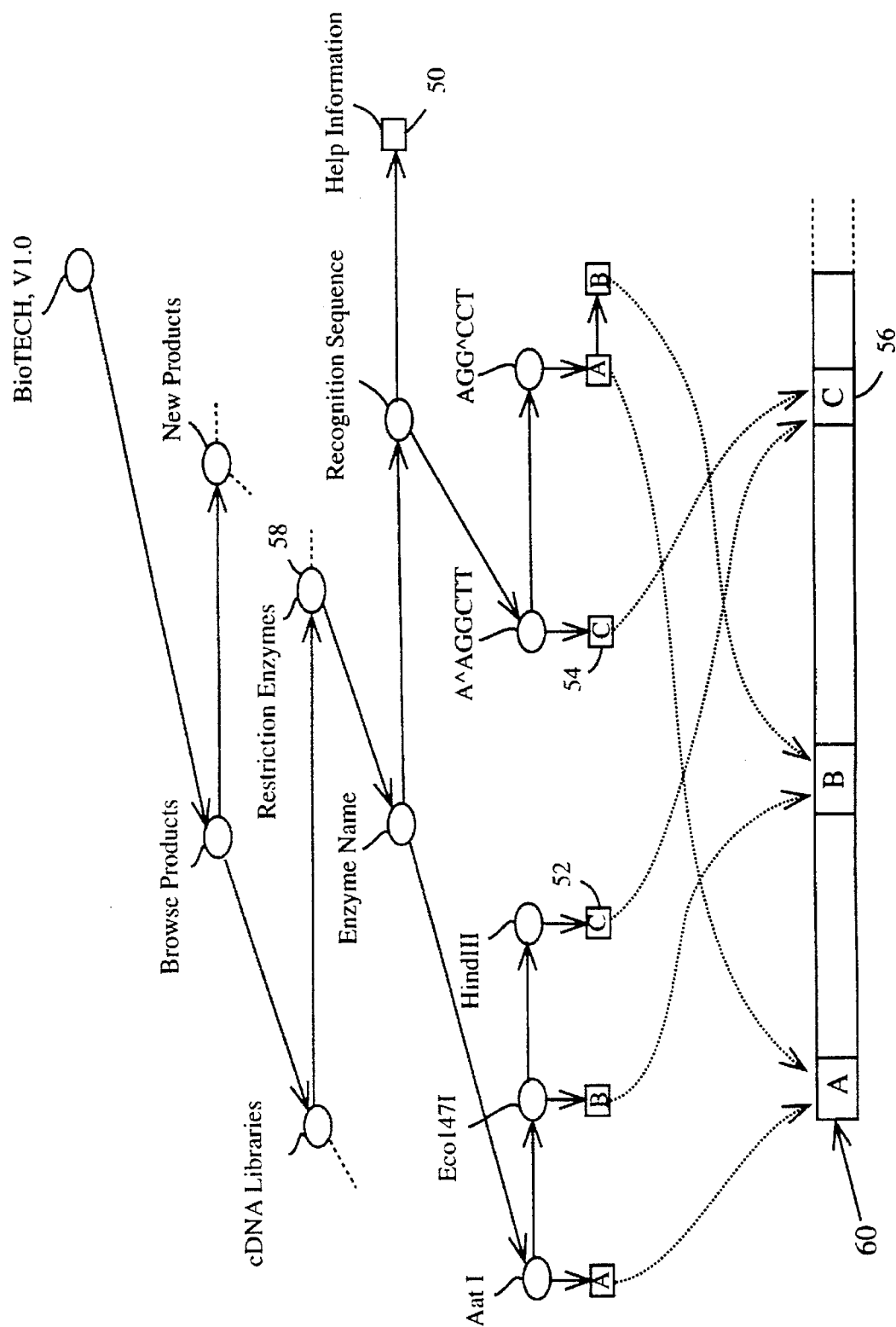
FIG. 5 is a graphical representation of a particular application of the open hierarchical data structure of FIG. 4.

FIG. 5 shows a graphical representation of how the open hierarchical data structure points to the media elements in a data file 60. Data nodes in the open hierarchical data structure store address information on each media element in an object.

Typically data nodes are located at the bottom of a path but they can also be deployed at other levels of the structure in sibling lists like data node 50 as a type of Help entry that uses various media elements.

The open hierarchical data structure in the present invention enables multiple data nodes, 52 and 54, to store the same address for a location 56 in the data file 60. This feature enables an author to go beyond the most narrow category at the lowest level of a traditional classification scheme and continue to separate one object from another based on their respective attributes. For example, an author could add any number of relevant attributes underneath the Restriction Enzyme at branching node 58 to further differentiate one product from another. This improvement provides an author with a very powerful way to add more detail into the menu system and make access more precise.

Figure 6:
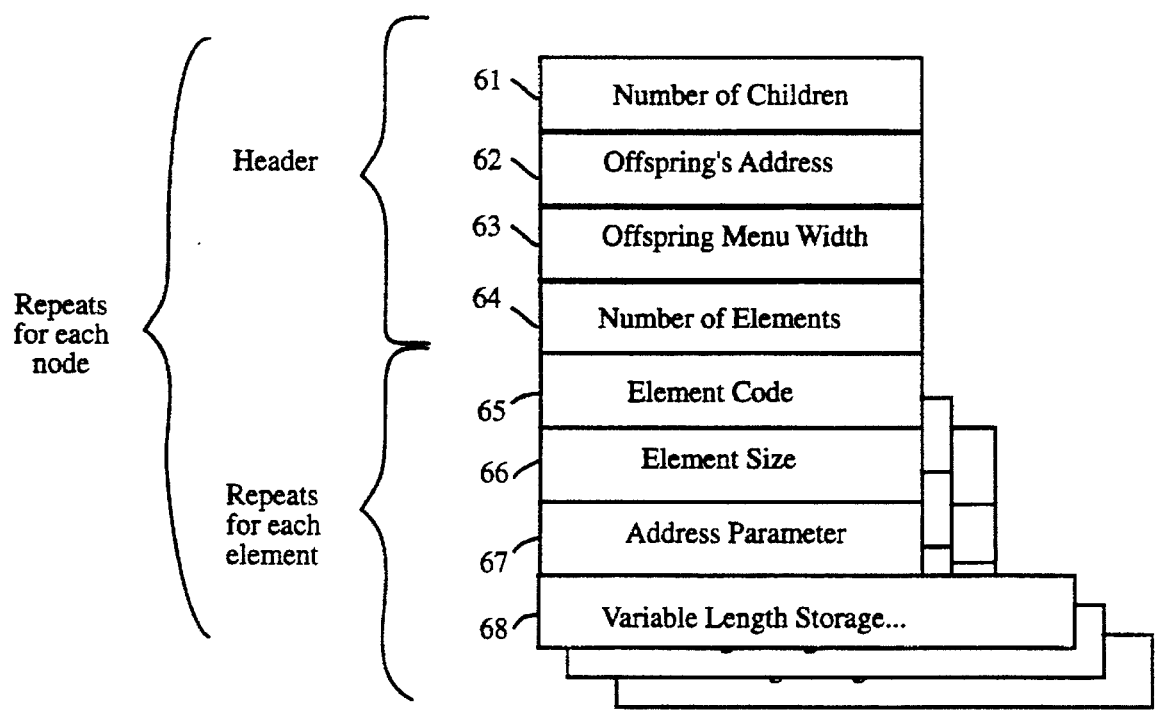
FIG. 6 is a graphical representation of the format of the menu file used to store the open hierarchical data structure.

FIG. 6 depicts the predetermined format of the menu data file 33 produced by the Application Generator 1. Each record in the menu data file 33 represents either a branching node or a data node in the open hierarchical data structure. The record structure has two parts, a fixed header and one or more sets of repeating fields.

In a branching node three of the header fields are used to describe the next menu level. This includes the address of its first entry, the Offspring's Address field 62; the number of entries, the Number of Children field 61; and its width, the Offspring's Menu Width field 63. However, a data node always has zero children and therefore only uses one other field in the record header, the Number of Elements 64. In both the branching and data nodes the Number of Elements 64 indicates the number of times the next set of fields repeat.

In this context an element can be a med/a dement or a data element. As discussed earlier, a media element can be any natural form of information that can be stored on electronic media. Data elements in the present invention represent coded information that is used by the Retrieval module 3 to verify a program environment, display objects, configure a selection menu, or encode an access path.

Each set of repeating fields is used to store information about each media element or data element associated with a branching or data node. This includes an Element Code field 65, an Element Size field 66, an Address Parameter field 67, and a Variable Length Storage field 68 that is designed to store text strings and address information like file specifications. The Retrieval module 3 uses the Address Parameter field 67 to locate a media element in a data file. An Address Parameter field 67 can store an absolute address, an offset or relative address, or an address expression. The preferred address methodology for the disclosed electronic catalog is an absolute address.

Elements corresponding to branching nodes are used for displaying information in a selection menu to the end-user [See Table 1 for a list of the corresponding element types, the code for the element code field 65, and the what the clement stores in the variable length field 68.] An entry in a selection menu can be a text string and/or a graphic image. An entry can also have one or more labeled push-buttons or icons attached to the entry so the end-user can activate a (help) text block and/or broadcast an audio presentation. (Dedicated icons for help and audio clips are provided by the system.) An author can also assign a help icon and/or title to an offspring menu. When a text or graphics image is larger than the author-designated default entry-width, the Retrieval module 3 automatically displays the entry in a scrolling region.

Elements assigned to a branching node can also be used by the Retrieval module 3 to track information about the branching nodes selected by the end-user in an access path. In some applications an interactive code can be assigned to a branching node to represent an end-user's response to an entry in the selection menu. An author can also use a set of branching codes to provide coded information about the access path selected by the end-user. This can include the skill level needed to use a specific access path or the professional wording or orientation of its menu entries.

TABLE 1

| BRANCHING NODE ELEMENTS | | |
|---|---|---|
| Code | Variable Length Field | Element Type |
| 100 | Text Literal | Menu entry - text string |
| 101 | Address | Menu entry - text block |
| 102 | Address | Menu entry - graphic |
| 104 | Address | Menu entry - help icon |
| 108 | Address | Menu entry - audio icon |
| 110 | Address | Menu entry - push-button title |
| 112 | Address | Push-button - text block |
| 120 | Address | Offspring menu - help icon |
| 122 | Text Literal | Offspring menu-title |
| 150 | Data | Branching Code |

In the disclosed electronic catalog, the Retrieval module 3 uses the set of repeating fields in a data node, including the Address Parameter field 67, to fetch media elements for displaying a product object in the object screen. This includes media elements like blocks of text, bit-mapped images, photographs, context-sensitive help, audio broadcasts, and video. When building an Information System the author assigns an access method for each media element. Media elements can be accessed by a push-button like the Heat Graph command 94 in FIG. 8 or by clicking on a window frame with a pointing device. [See Table 2 for a detailed list of data node elements.]

TABLE 2

DATA NODE ELEMENTS

| Code | Variable Length Field | Element Type |
|---|---|---|
| 200 | Text Literal | Object Screen Title |
| 210 | Address | Bit Mapped Image |
| 212 | Text Literal | Bit Mapped Window Title |
| 213 | Text Literal | Bit Mapped Prompt Label |
| 220 | Address | Text Block |
| 222 | Text Literal | Text Block Window Title |
| 224 | Text Literal | Text Block Prompt Label |
| 230 | Address | Audio |
| 232 | Text Literal | Audio Prompt Label |
| 240 | Address | Video |
| 242 | Text Literal | Video Window Title |
| 244 | Text Literal | Video Prompt Label |
| 250 | Address | Photograph |
| 252 | Text Literal | Photograph Window Title |
| 254 | Text Literal | Photograph Prompt Label |
| 290 | Address | Help Text |
| 292 | Text Literal | Help Window Title |
| 294 | Text Literal | Help Prompt Label |

And finally, the root (branching) node 40 has its own special elements which are used to validate the application environment. [See Table 3 for details.] This includes version number information and the date of the release. It also includes data on how many days the product information is valid. The Retrieval module 3 checks the release date against the computer's current date. If the data is expired, the system issues a warning message indicating how long the data has been out of date or an error message that the data can not be read.

TABLE 3

ROOT (BRANCHING) NODE ELEMENTS

| Code | Storags Holds | Element Type |
|---|---|---|
| 400 | Numeric | Version Number |
| 402 | Numeric | Release Date |
| 404 | Numeric | Data Shelf life |
| 406 | Numeric | Data Black Out |
| 410 | Text Literal | Application Title |

Figure 7:
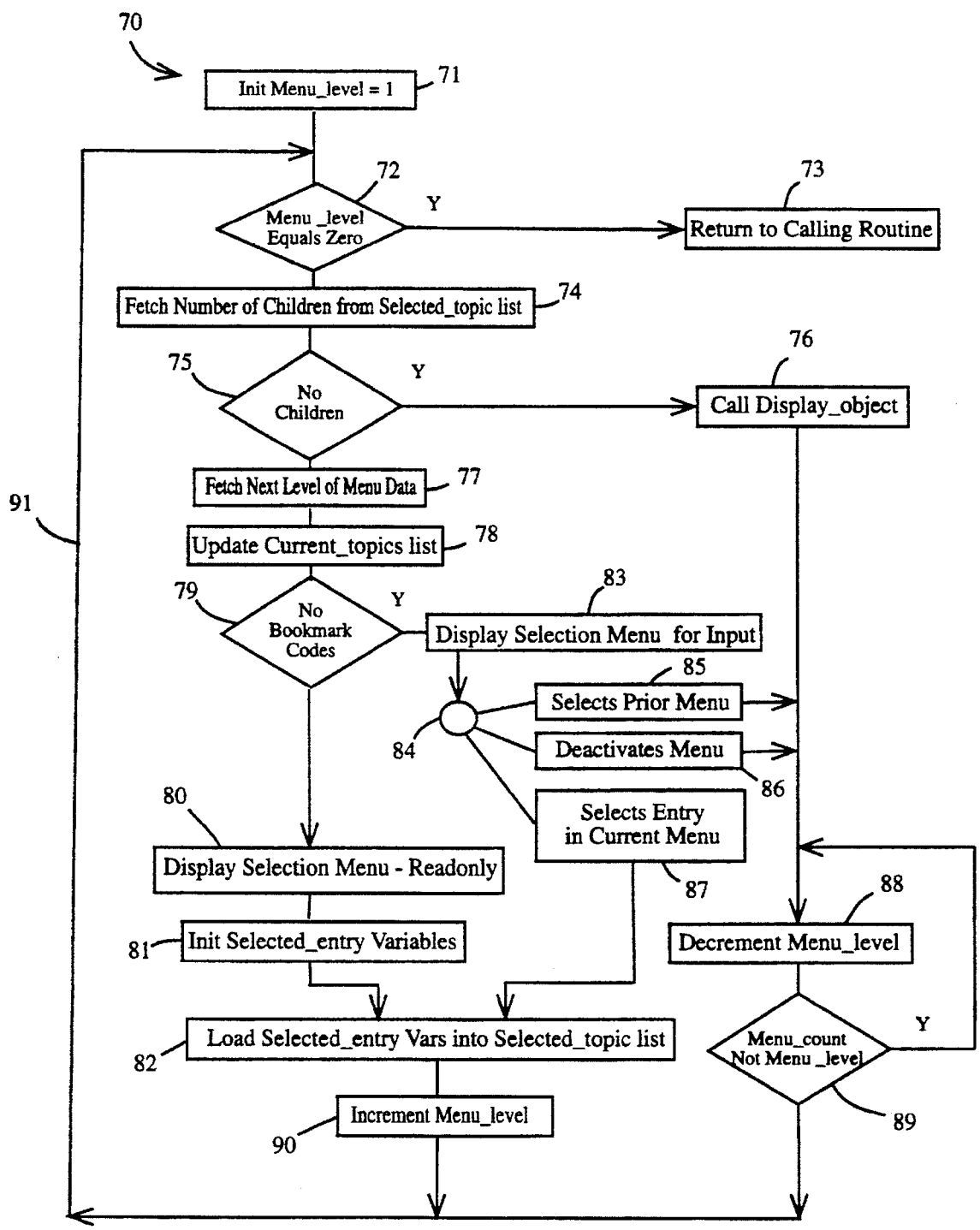
FIG. 7 is a flow chart of the Selection_menu routine executed by the Retrieval module

FIG. 7 shows the flow chart of the Selection_menu routine 70 in the Retrieval module 3. This routine iterates through the open hierarchical data structure stored in the menu data file 33 to create a succession of selection menus. The menus guide the end-user to the information objects stored in the product data files 20. Selection_menu is called from a number of different routines in the Retrieval module 3. This includes routines called from commands in the Application Screen 141 and a bookmark routine which reconstructs an end-user's menu path stored in the bookmark data file 36.

Selection_menu maintains two different linked lists to dynamically construct the menu path. Each entry in the current selection menu is stored in the Current_topics list along with data on the next menu level such as the number of children and their addresses. When an end-user selects an entry in the current selection menu the entry and its next menu level data are transferred to the Selected_topic list. The Selected_topic list keeps track of the menu path taken by the end-user.

When the Retrieval module 3 is activated menu data from the first level of the open hierarchical data structure is collected. Menu data is used to generate the search commands for the push-button display in the Application Screen 141. It is also used to initialize the Current_topics list. When an end-user selects one of these search commands in the Application Screen 141, the command routine updates the Selected_topic list and calls the Selection_menu routine 70.

As mentioned before, the Selected_topic list is updated by the calling routine before it calls Selection_menu routine 70. In one special case, the data stored in Selected_topic needs additional attention. That is, just before the Bookmarks_routine calls Selection_menu routine 70 it loads special coded information in the Selected_topic list to represent the branches taken by the end-user.

When the Selection_menu routine 70 is called at step 71 the menu_level variable is set to one and control passes to a loop 91 in the routine. The first step 72 in loop 91 checks the menu_level. A menu_level equal to zero returns program control to the calling routine at step 73. Otherwise Selection_menu routine 70 fetches the number of children from the Selected_topic at 74 and tests the number of children at 75. If there are no children the Selection_menu routine 70 calls the Display_object routine at 76. Otherwise the routine fetches the next level of menu data at 77 and updates the Current_topics list at 78.

At 79 the Current_topics is tested for coded bookmark information. If bookmark codes are present then Selection_menu routine 70 displays all Current_topics in a read-only selection menu at 80. At 81 the routine translates the coded bookmark information into variables that are used to initialize the Selected_topic lists at 82.

If bookmark codes are not present in the Current_topics list the topics are displayed in a selection menu at 83 for a end-user event at 84. The end-user has three options. She can select an entry in the current menu at 87; she can deactivate or quit the current selection menu at 86; or she can go back to an earlier selection menu at 85 by clicking on its edge with a pointing device.

Each time the end-user selects an entry in a selection menu Selection_menu updates the Selected_topic list at 82 and increments the menu_level variable at 90. Next, control passes to loop 91 and returns to step 72.

Deactivating or quitting a selection menu causes Selection_menu to decrement menu_level at 88. Next, the menu_level is compared to the menu_count at 89. Menu_count, a global variable, is updated by the event manager and used to keep track of the number of selection menus. If the menu_level is not equal to the menu_count at 89 then control loops back to step 88 to decrement the Menu_level. When the Menu_level equals the Menu_Count at 89 control passes to loop 91 that returns to step 72.

In order to make disk access as efficient as possible the Retrieval module 3 fetches large blocks of menu data at one time and stores them in an input buffer. Sometimes the next menu address can be located directly in the input buffer. Other times the Retrieval module 3 has to fetch it from disk.

The performance of a CD-ROM device is directly tied to the number of times it has to reposition the reading head or seek a new location on the disk in order to fetch data. If it has to perform numerous disk seeks—to generate an object's address the way a database or text retrieval system does with a boolean search—its performance can be slow and the end-user may have to wait for a response. To avoid performance problems like this the present invention precompiles address data for all media elements and selection menus and stores it in the address parameter field 67 in the menu data file 33 which is loaded into fast memory.

Each time the Retrieval module 3 displays a selection menu to the end-user the Retrieval module 3 always has the immediate address for any option selected. To move down a menu path the Retrieval module 3 uses the set of next menu addresses in Current_topics list. To back up to a prior menu it uses the addresses in the Selected_topic list. And to display an object it uses the address data that was transferred from the menu file to pointers in the Current_topics list. The primary advantage to this approach is that it avoids performance lags associated with repositioning the reading head by insuring that any end-user request can be fulfilled by a single disk seek.

Figure 8:
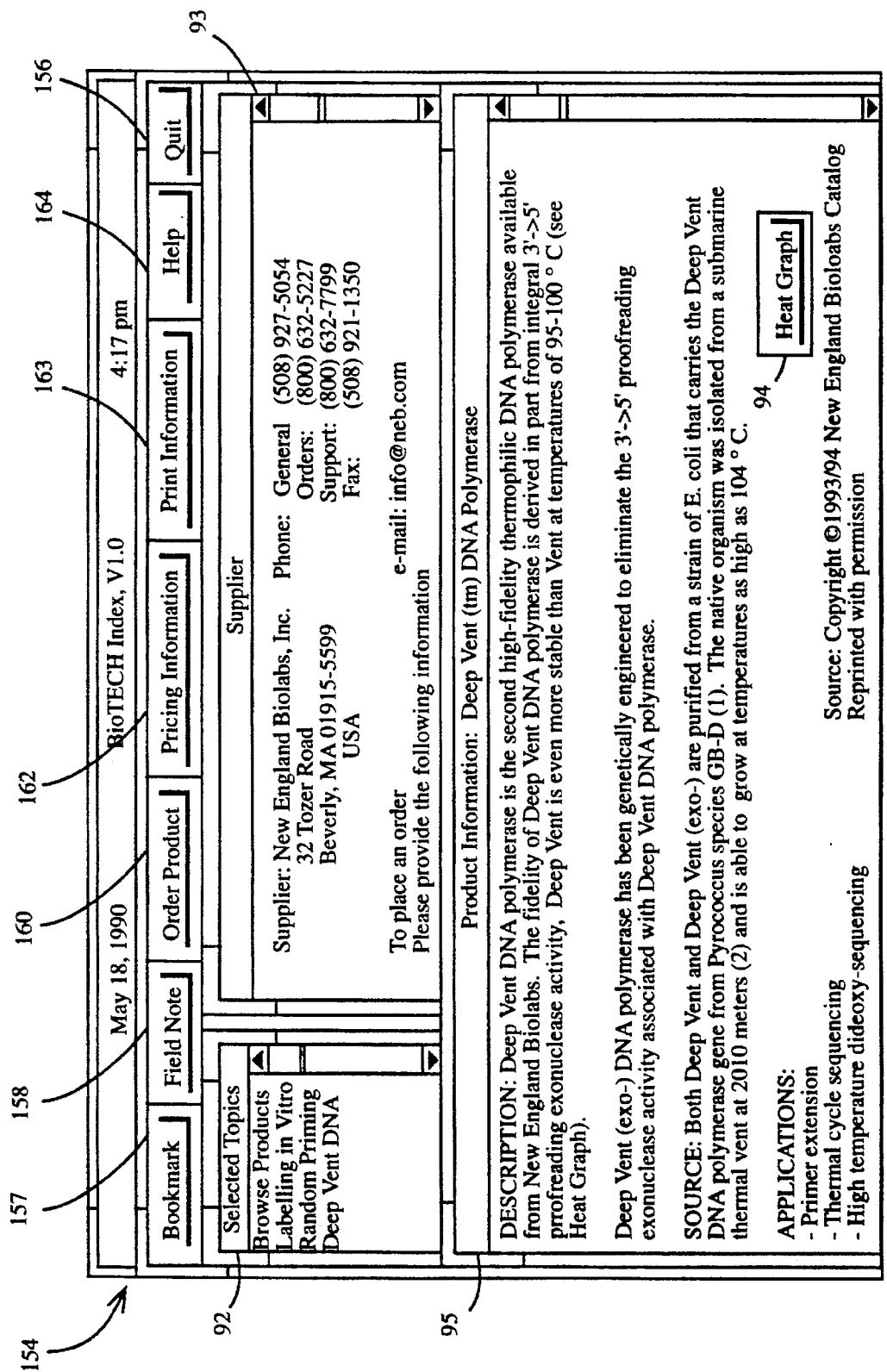
FIG. 8 is a pictorial representation of an example product screen generated by the Retrieval module.

When the end-user has completed all of the selection menus the Retrieval module 3 fetches the media elements and presents them in the object screen. FIG. 8 shows the object screen for the disclosed electronic catalog. Here the information object is a product object and the object screen is a product screen. Across the top of the Product Screen are the system commands which are available to the end-user (see FIG. 15 for a complete list and description of these commands). In the upper left hand corner of the screen is a scrolling list 92, labeled "Selected Topics". The scrolling list 92 includes all the menu entries selected by the end-user to get to the product object displayed in the product screen.

The features and layout of an object screen is custom-designed by an author. The Retrieval module 3 generates the display at runtime based on information in the menu data file 33 and the configuration data file 34. The configuration data file 34 stores data on the special features built into the object screen like the Order Product command 160. The menu data file 33 stores data on the media elements that make up the information object and how they should be accessed and displayed on the object screen.

The object screen uses two types of windows to display visual media elements: element displays and element windows. An element display window, like the Product Information window 95, simply displays its data in an unrestricted region of a scrolling window.

An element window has a field-oriented format which is created by an author with a screen editor. Fields are derived from a single element structure and positioned directly on the window. An author can also add a label or title to the field position in the window. The Supplier window 93 in FIG. 8 is an example of an element window.

The author designs an object screen by adding windows to it or by assigning specific elements to a display object. Window elements like the Product Information window 95 or the Supplier window 93 in FIG. 8 are assigned a position on the screen by the author. The author can also assign push-button access to a media element at the screen command level like the Pricing Information command 162 (see the Systems Screens command 138 in FIG. 13 for details). Or the author can assign push-button access to the media element itself. In this case a push-button is displayed at the bottom of the screen like the Heat Graph command 94 in FIG. 8 (see the Edit Object command 127 in FIG. 12 for details). And finally, the author can also assign an audio clip to the screen which starts its broadcast when the screen is first displayed.

Figure 9A:
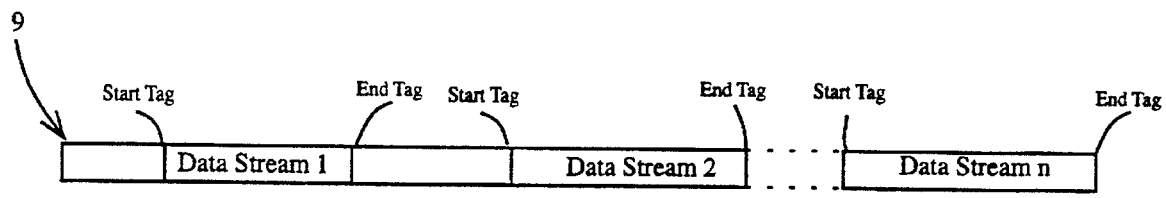
FIGS. 9a–9d are graphical representations of the respective record structures of the input file of FIG. 9a, the application generator data file of FIG. 9b, and the summary file of FIG. 9c that are used by the Application Generator to create the specially formatted data file of FIG. 9d.
Figure 9B:
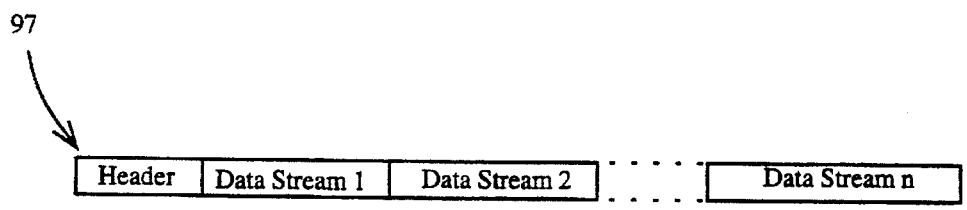

FIGS. 9a through 9d shows the file formats used by the Application Generator 1 to generate a data file, OBJnnn.ZXI, for the Distribution files 2. An input file 9 is depicted in FIG. 9a. An author marks off the data streams in input file 9 to identify relevant media elements and then uses the Application Generator 1 to define a record structure for the media element. Next the author uses the Application Generator 1 to import the data streams into the work file 97, OBJnnn.DAT, depicted in FIG. 9b.

Figure 9C:
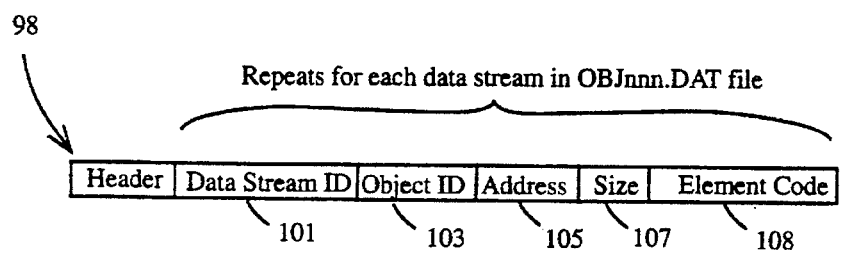

The Application Generator 1 maintains summary information about each media element in work file 97 in summary file 98, OBJnnn.SUM, depicted in FIG. 9c. Each record in file 98 stores summary information about each media element in OBJnnn.DAT file 97. The fields within each record include a data stream identification code field 101, an information object identification code field 103, an address field 105 that stores the location of the media element in the OBJnnn.DAT file 97, a size field 107 that indicates the storage requirements for the media element, and an element code field 108.

Some of the fields in the record of the summary file 98 directly correspond to fields in the menu data file 33. This includes the element code fields 108 and 65 and the size fields of the media element 107 and 66. Other fields in the record are used to manage the set of relationships between a media element and its associated information object like fields 101,105, and 103.

When the author is ready to distribute the collection of information, she uses the Application Generator 1 to configure the Distribution files 2 according to the storage capacity of the distribution media. The process starts with the Application Generator 1 approximating logical groups of related objects which can fit within the target media size. It does this by visiting each data node in the open hierarchical data structure and computing the storage requirements needed for each information object. Next, it groups related objects and then assigns a numeric order to the information objects and their media elements according to the menu level and sibling list of the corresponding data node. This approach assures that the final layout of the media elements will be optimized for retrieving sets of related objects.

Next, the Application Generator 1 computes each media element's absolute address in the target data file from size information in the summary file 98. The Application Generator 1 loads the absolute address into the address parameter field 67 in the corresponding data node and outputs the branching and data node information to the menu data file 33. And finally the Application Generator 1 compresses the media elements and outputs them to their respective data files.

Figure 9D:
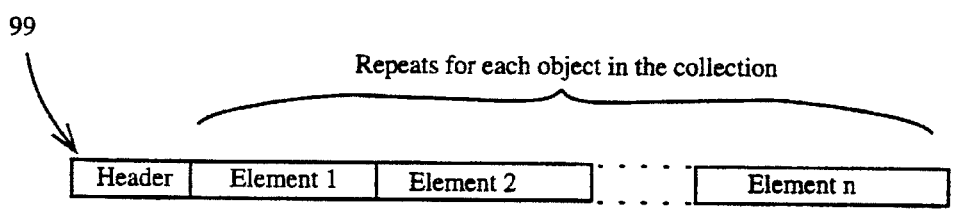

The relationship between a media element and its object plays an important role in determining which type of data file is used to store the element. When an element has a single record for each object, the element is said to have a one-to-one relationship to the object. For example a product picture would have a one-to-one relationship to its corresponding product object. And when an element has multiple data records for each object it has a many-to-one relationship to the object, like multiple price records for each size of the same product for example. Elements which have a one-to-one or many-to-one relationship are always stored in the same data file according to their respective objects. The OBJnnn.ZX1 file 99 depicted in FIG. 9d is an example of this type of data file. The "nnn" in the data file name denotes the unique numbering used to identify a particular data file in a distribution set.

When an element has a one-to-many relationship to an object like a supplier to a group of product objects, the element is stored in a special type of data file like the company data file 35 in FIG. 3. The one-to-many data file is the second type of data file found in the set of Distribution files 2. The one-to-many element data is always stored in its own file so it can be loaded into fast memory for repeated access by the Retrieval module 3.

Figure 10:
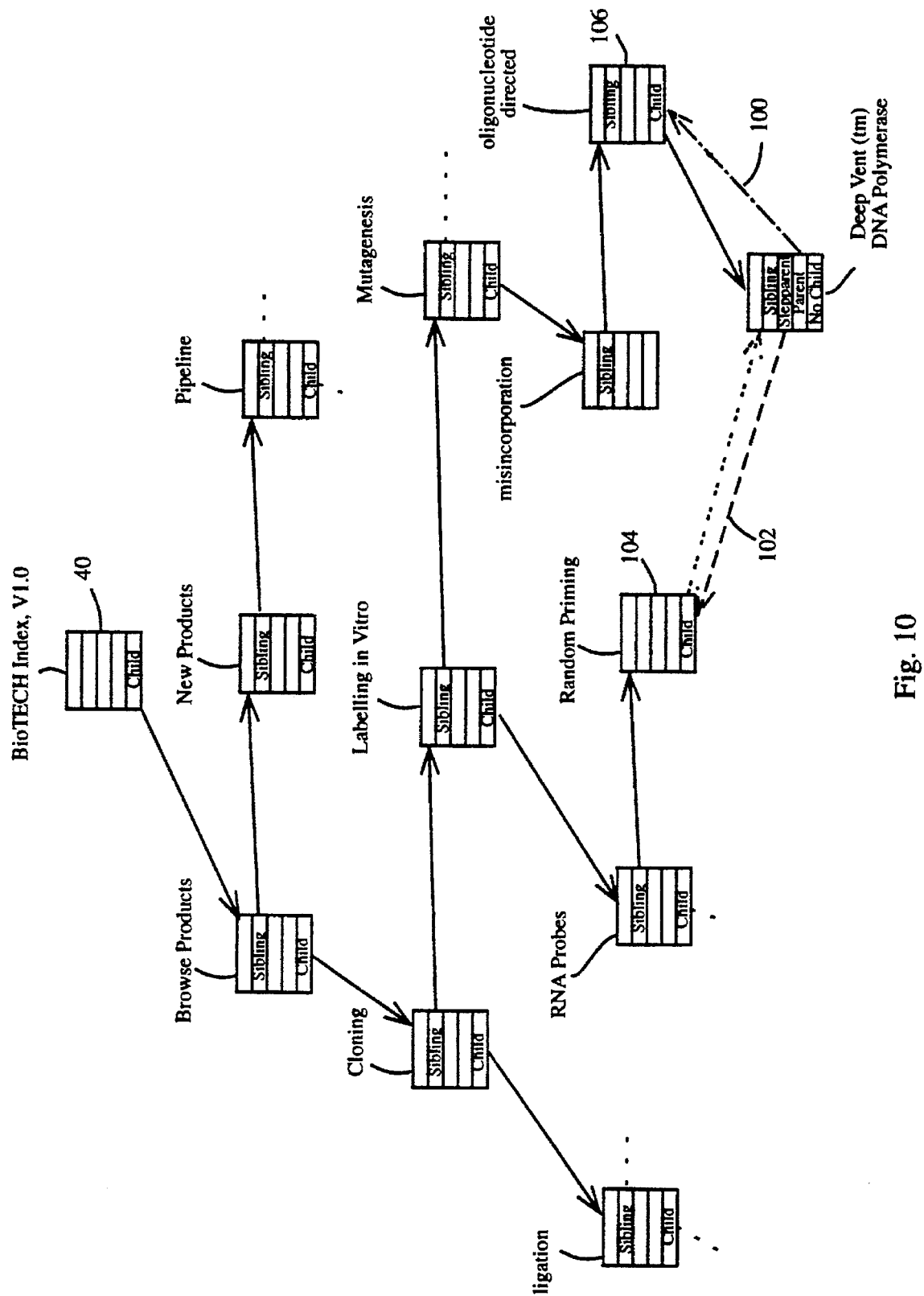
FIG. 10 is a graphic representation of the open hierarchical data structure showing the links created by the Application Generator.

FIG. 10 presents an example of how the Application Generator 1 uses two additional pointers in each node to back up the multiple pathways in the open hierarchical data structure. In addition to the child and sibling pointers described in FIG. 4 each node in the Application Generator 1 also has a single pointer to a primary parent like link 100 and one or more stepparent pointers like 102. The stepparent pointer provides a two-way link between a node and a primary parent and one or more of its stepparents. This link enables an author to back up a level in the structure and choose between visiting a node's primary parent like node 106 or one of its stepparents like node 104. This feature is particularly useful to an author who needs to manually navigate the information structure in order to understand its organization from an end-user's perspective.

Figure 12:
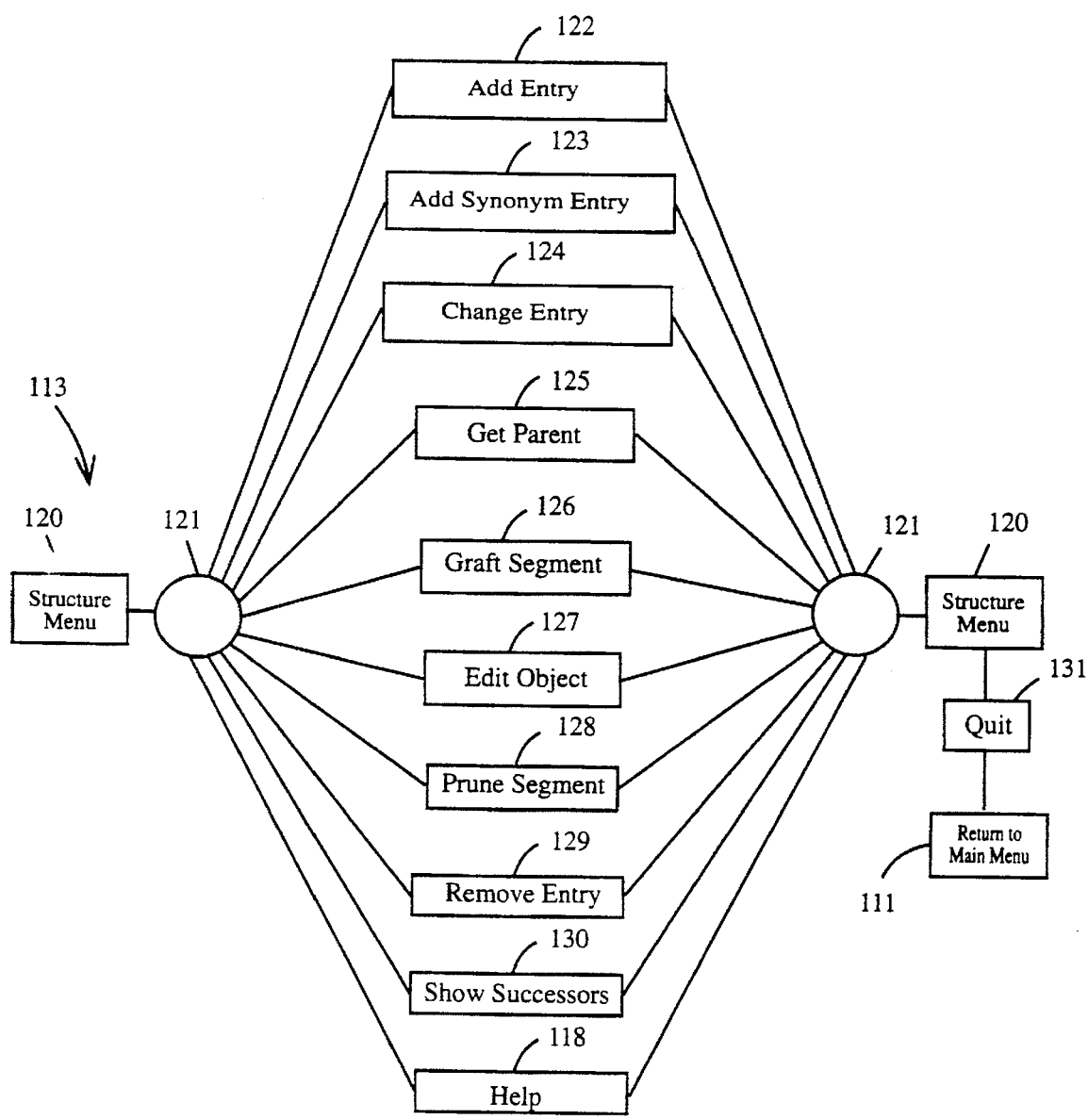
FIG. 12 is a flow chart of the available commands in the Structure Menu display in the Application Generator.

The Application Generator 1 provides the means to back up the open hierarchical data structure with the Get Parent command 125 in Structure Menu (See FIG. 12 for the details). This command produces a selection menu that includes the primary parent and all stepparents in bold characters. (In the Retrieval module 3 an end-user can only retrace menus he or she had previously selected.)

The root (branching) node 40 in the open hierarchical data structure in FIG. 10 identifies the title for the disclosed electronic catalog, "BioTECH Index, V1.0". At the next level of the structure are labels for the search commands. As previously indicated, the Retrieval module 3 generates a labeled push-button command in Application Screen 141 for each search command found in the first level of the open hierarchical data structure. The Browse Products command 143 organizes products according to associated laboratory techniques. In this classification system some enzyme products may be used to perform different techniques, depending upon how the product is used. Notice the object corresponding to the Deep Vent DNA has a stepparent 104, Random Priming, in addition to a primary parent 106, oligonucleatide directed. The ability to represent products according to how they are used in the laboratory is particularly helpful to a buyer who may be unfamiliar with the materials or even new to the field. This type of organization is based on conceptual associations and is typically used for organizing information in the manner of a thesaurus.

Figure 11:
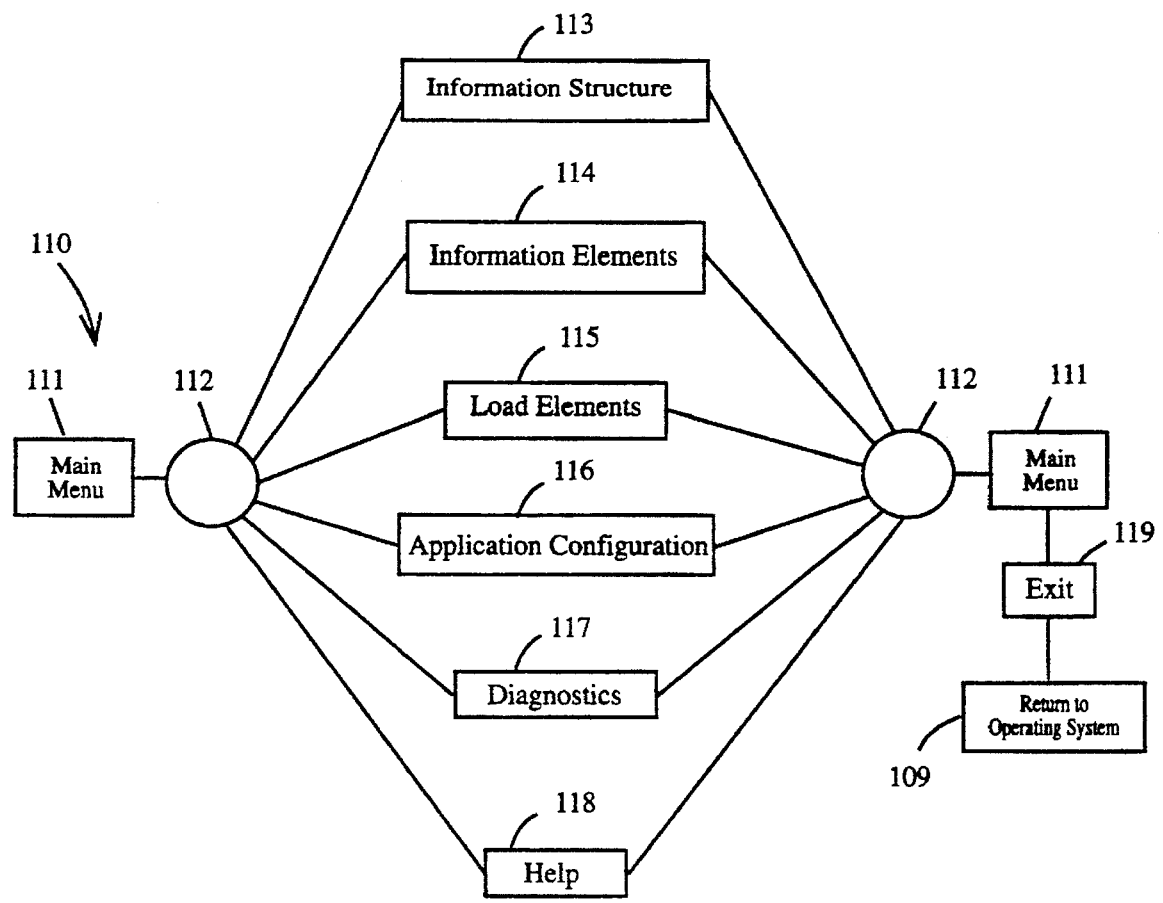
FIG. 11 is a flow chart of the available commands in the Main Menu display of the Application Generator.

FIG. 11 shows a functional flow chart of the Main Menu 110 commands in the Application Generator 1. When the Application Generator 1 is turned on, the Main Menu display 111 is shown. The author may then select at step 112 any one of these commands and upon exiting the command the author returns to the Main Menu display 111. The Exit command 119 returns the author to the operating system 109. The Main Menu commands are displayed in a pull-down menu and include:

(a.) The Information Structure command 113 provides the means for a domain expert to build an open hierarchical data structure and organize the objects in the collection. FIG. 12 shows the functional flow chart of the Information Structure commands in further detail.

(b.) The Information Elements command 114 provides the means for an author to define and manage the media elements which are used to represent the information object. An author creates a record structure for each media element he or she intends to import into the system. It should be noted that an author is free to assign any combination of media elements to any given object in the collection.

Each media element definition has a name, a record structure, and a relationship code. The record structure consists of one or more text, binary, numeric, or currency fields. Binary fields can store any type of data or type of data format. The relationship code indicates how many of the element data records will be related to the same object. As indicated previously this includes a one-to-one, a many-to-one, and a one-to-many relationship between the number of element records and a given object.

The Application Generator 1 also provides an author with a library of pre-defined elements which can be used to develop specific types of applications. In the example application herein disclosed, some predefined elements have been used to help build the product index, keep track of a list of registered end-users, and enable the end-users to order products located in the system. The elements supplied by the system library managed by the Application Generator 1 and used in the disclosed application include, COMPANY, a predefined element that is used by the Retrieval module 3 to display company information to the end-user and generate product orders. It stores information which is typically used by a buyer to contact a company or place an order such as company name, address, city, state, FAX, and dedicated phone numbers for orders or support. It also includes detailed information on shipping and handling polices and how the company applies discounts on volume purchasing. This information is stored in the company data file 35 and integrated into an Information System by the Retrieval module 3 that uses fields from this media element to generate summary information on product orders.

The PRICES element is another predefined media element which is used to store information on a product's catalog number, unit measure, and price. PRICE has a many-to-one relationship to the product object. Here multiple PRICE records are used to indicate differences in pricing based on size or weight. The Retrieval module 3 uses selected fields in the PRICES media element to generate product orders.

(c.) The Load Elements command 115 provides the means for an author to load media elements into the work files 10. It does this by reading input file 9 or by prompting the user for field values in the record. When reading input file 9 the Application Generator 1 looks for special characters in the file that designate a data node, object name, or element stream. Otherwise the author has to link the media element manually (see FIG. 12, the Edit Object command 127 for details). Summary information on each media element is maintained in the OBJnnn.SUM work file 98 (see FIG. 9c for details).

(d.) The Application Configuration command 116 provides the means for customizing the Information System created by the Application Generator 1 and configuring its Distribution files 2 (see FIG. 13 for details).

(e.) The Diagnostics command 117 provides the author with a set of subcommands that can be used to monitor and control all aspects of the Information Structure and its objects. For example, there are commands to generate reports on all incomplete or unlinked parts of the Information Structure like orphaned media elements, branching nodes, or data nodes. Additional commands enable an author to delete objects from the system files and reuse memory. There are also commands that provide detailed reports on all access paths including maps and extensive branch listings.

(f.) The Help command 118 provides a hierarchy of help screens concerning the Application Generator 1 and its context-sensitive help facility.

FIG. 12 shows the functional flow chart of the commands available to the author in the Structure Menu 120 when he or she selects the Information Structure command 113 in the Application Generator 1. These commands provide the means to create new open hierarchical data structures, design and manage the topic relationships, and edit topic entries in an existing data structure.

The layout of the Structure Menu display 120 is designed to provide an author with a comprehensive view of the open hierarchical data structure and all of its elements. The current level of the data structure is displayed in a scrolling window in the center of the screen. In the upper left hand corner of the screen is a list of all selected topics in the current path. In the lower left hand corner of the screen a scrolling window displays a map of all the access paths in the open hierarchical data structure.

The commands available to the author in the Structure Menu display 120 are displayed in a pull-down menu. At step 121 the author selects any one of these commands and upon exiting the command the author returns to the Structure Menu display 120. The Quit command 131 returns the author to the Main Menu display 111. The Structure Menu display 120 commands include,

- (a.) The Add Entry command 122 adds a branching node to the open hierarchical data structure at the current display level and links it to the sibling list. The system prompts the author to indicate if the entry is text or image and if it should attach a push-button, a help icon, or an audio icon to it. This command also prompts the author for a branching code or to indicate if the entry should be read-only. Read-only entries can be used to provide a permanent help display in the selection menu or ask a question to be answered by one of the other menu option selections.
- (b.) The Add Synonym Entry command 123 adds a node to the current level and links it as a sibling. The author must navigate the information structure to identify an equivalent entry. This command makes the new (synonym) entry a stepparent to the equivalent entry's first child, and the equivalent entry's first child becomes the stepchild of the synonym entry.

In order to insulate the menu system from any unwanted side-effects, the Application Generator traces all new paths created by the synonym entry. If any newly formed directed cycles are detected (implying that some node is a descendant of itself!) the Application Generator I requires authorization from the author before it completes the assignment.

- (c.) The Change Entry command 124 provides the means for replacing a menu entry and/or changing its position in the menu.
- (d.) The Get Parent command 125 enables an author to move back up the data structure and display all the nodes at the parent's level. For nodes which have one or more stepparents, a special selection menu displays the primary parent entry and each stepparent entry.
- (e.) The Graft Segment command 126 is used in conjunction with the Prune Segment command 128 to enable an author to sever portions of the open hierarchical data structure, store them, and then relink to the open hierarchical data structure.

These commands can be used by the author to move entire categories from one branch to another without having to reconstruct that part of the structure.

- (f.) The Edit Object command 127 provides the means for creating an information object and adding media elements to it. The author navigates through the structure to a target menu level and issues the Edit Object command. Then she Creates the object and is prompted to Add one or more elements to it. Each time the author adds an element the system prompts the author for information on how that element should be accessed in the object screen. Media elements can be accessed either through a push-button or by clicking on a window frame of the media element displayed in the screen. The author also uses this command to assign titles and positioning information for windows, and labels for the push-buttons.
- (g.) The Remove Entry command 129 deletes an entry from a node or a node from the open hierarchical data structure. The command will only delete a node that does not point to a successor.
- (h.) The Show Successor command 130 displays all of the entries at the next menu level. Stepchildren are displayed in bold letters. If a data node is selected this command displays the name or identification number of each media element associated with the information object.

Figure 13:
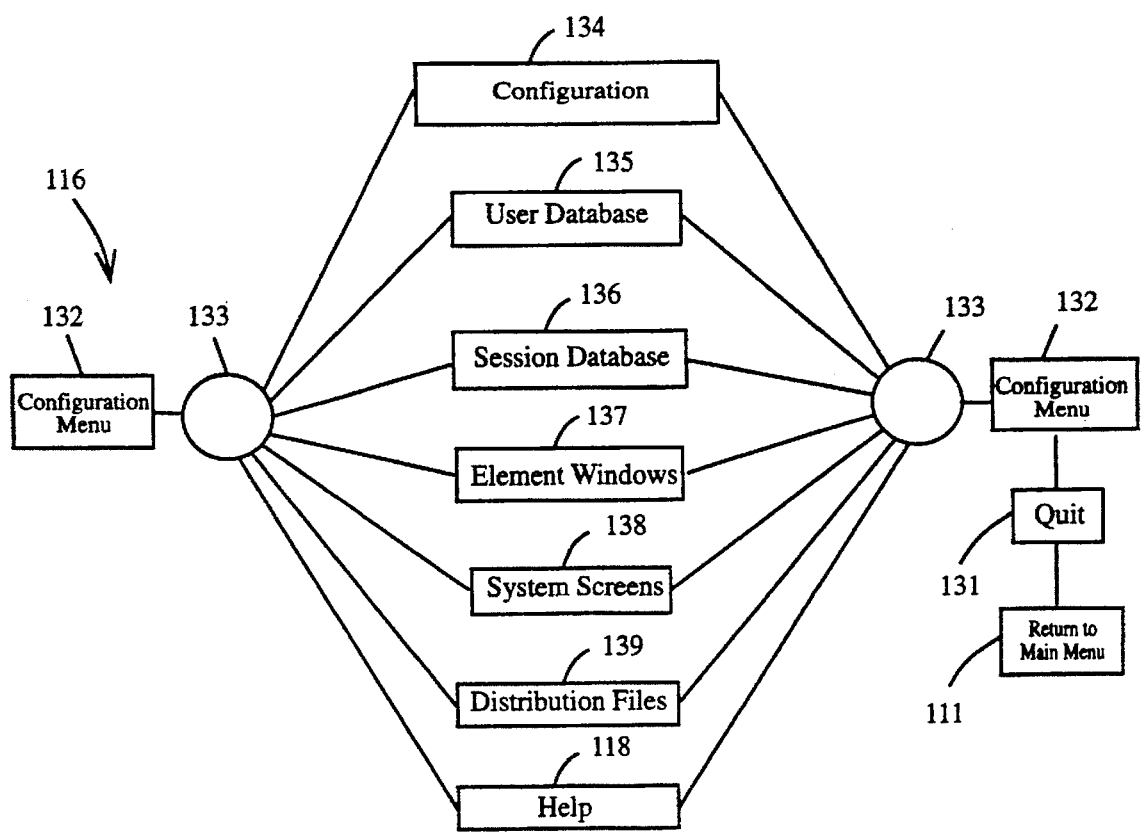
FIG. 13 is a flow chart of the available commands in the Configuration Menu display in the Application Generator.

FIG. 13 shows the functional flow chart of the commands available to an author in the Configuration Menu display 132 when she selects the Application Configuration command 116 in the Main Menu display 120. The author may select at step 133 any of its commands and upon exiting the commands the author returns to the Configuration Menu display 132. The Quit command 139 returns the author to the Main Menu display 111.

The Configuration Menu 132 commands provide the means for customizing an Information System and for configuring its distribution files. When the Application Configuration command 116 is given in the Main Menu display 111 the Application Generator 1 prompts the author with a list of existing configuration files along with a NEW entry option. The author can choose to edit a previous configuration file or create a new one.

The Application Generator 1 library also provides the author with a set of predefined configuration files which represent complete Information Systems. The configuration file for the disclosed electronic catalog was adapted from a library file CATALOG.CFG. This file configures an electronic catalog which has password access and a product order and transmission capability. The author made changes to the file and then saved the file as BioTECH.CFG.

The commands available in the Configuration Menu display 132 screen include the following,

- (a.) The Configuration command 134 provides the means for assigning version numbers, release dates, and the number of days the data is valid. It is also used for enabling special features in the application like sign-in screens and password systems. An author can also use this command for integrating file translators into an Information System in order to convert product orders directly into specially formatted files like an Electronic Data Interchange (EDI) format.
- b.) The User Database command 135 provides the means for creating a database in the stand-alone Information System that manages information on end-users registered to access the system. Typically the User database includes fields like name, department, title, and so forth. Selected fields in the database are used by other features in the Information System to create product orders and provide password access. A predefined USER database supplied by the system library was used in the disclosed electronic catalog.
- c.) The Session Database command 136 provides the means for creating a Session database in the stand-alone Information System that stores information associated with selections made by the end-user. The Session database structure is derived from fields in existing media element definitions, system-supplied variables like date and time, and author-defined variables and functions. The record structure of the Session database has two parts, a Session Object and one or more Selection Objects.

A Selection Object in the disclosed electronic catalog includes one or more fields derived from one or more media elements in the product object displayed in the product screen. For instance, a set of fields are drawn from the PRICE media element and repeat for each PRICE selection made during a session. These selected fields form the basis of a line item in the product order.

A Selection Object can also store data on the sequence of branches selected by an end-user to reach a product screen. When there is more then one path to the same object the access path selected by an end-user can reveal important information about his or her background. For instance, coded information in the branching nodes could be used to signify an access path specifically designed to respond to differences in expertise or professional background. Thus data on an access path can provide useful marketing information about an end-user.

A Session Object has one or more fields that are used to identify the end-user session and store summary information about the session. The identity fields are drawn from the User Database, a system date, and a supplier's name. Summary information includes one or more fields that are associated with an author-defined formula. The formula uses computational expressions which reference selected fields in Selection Objects created during a session. The result is stored in the summary field and used to generate the product order.

To create a Session Database the Application Generator 1 guides an author through the parts of the database by presenting menus of relevant media elements and their respective fields. An author selects a field from the menu to add the field to the Session database structure and create a link between a source media element field and its destination field in the Session database.

The Session Database command also provides the means for editing an existing structure to meet a special application requirement. For instance, the ORDERS database used by the disclosed electronic catalog was derived from the predefined database supplied by the system library. The Retrieval module 3 creates the database at runtime based on information in the configuration data file 34; it stores the actual data for each order in the order dam file 37.

(d.) The Element Windows command 137 provides the means for creating a field-oriented window using a common screen editor. The author positions labels and display fields on the screen to create a display for the fields in a media element. The author can also assign a color arrangement, an input status (read/write or read-only), and a title to the element window. He or she can also assign a push button label to the element window to create a special access to the element. The Heat Graph push-button 94 at the bottom of the product screen in FIG. 9 is an example of this type of media element access. The System Screens command 138, described next, provides the means for linking an element window to a screen in an application.

(e.) The System Screens command 138 provides the means to customize screens in the target Information System configured by the Retrieval module 3. An Information System can have up to four different types of screens: an Application screen, an Object screen, a Session screen, and an optional End-user sign-in screen.

When an author selects a screen to edit, the Application Generator 1 displays various commands to customize the features and appearance of the screen. Each type of screen has its own configuration dialog box. The author configures the screen by filling in title fields, toggling switches to set usage flags, and selecting colors for foreground and background. The four screens include the following:

(1.) An optional End-user screen is used as a sign-in screen to collect information about the end-user and control access to the system when the password feature is enabled. The fields in the End-user screen are linked to the fields in the User Database. The disclosed electronic catalog uses the system supplied USERS Database as well as a ready-made sign-in screen called BUYERS. This screen has fields for the buyer's name, department, title, and so forth. The author also has access to a screen editor to create his own sign-in screen or adapt the BUYERS' screen to meet special application requirements.

(2.) The Session screen is used to display prior selections made by the end-user. It is used for commands like Product Orders 149 in the Application Screen 141 display in FIG. 14 of the disclosed electronic catalog. The set of commands used to customize this screen includes a screen editor for creating or changing the layout of the Session screen.

The disclosed electronic catalog uses the ready-made ORDERS screen supplied by the system library. A fixed region on the screen has fields to identify who made the order, the supplier, and the related summary information. The line items for each product ordered are displayed in a scrolling region.

Figure 14:
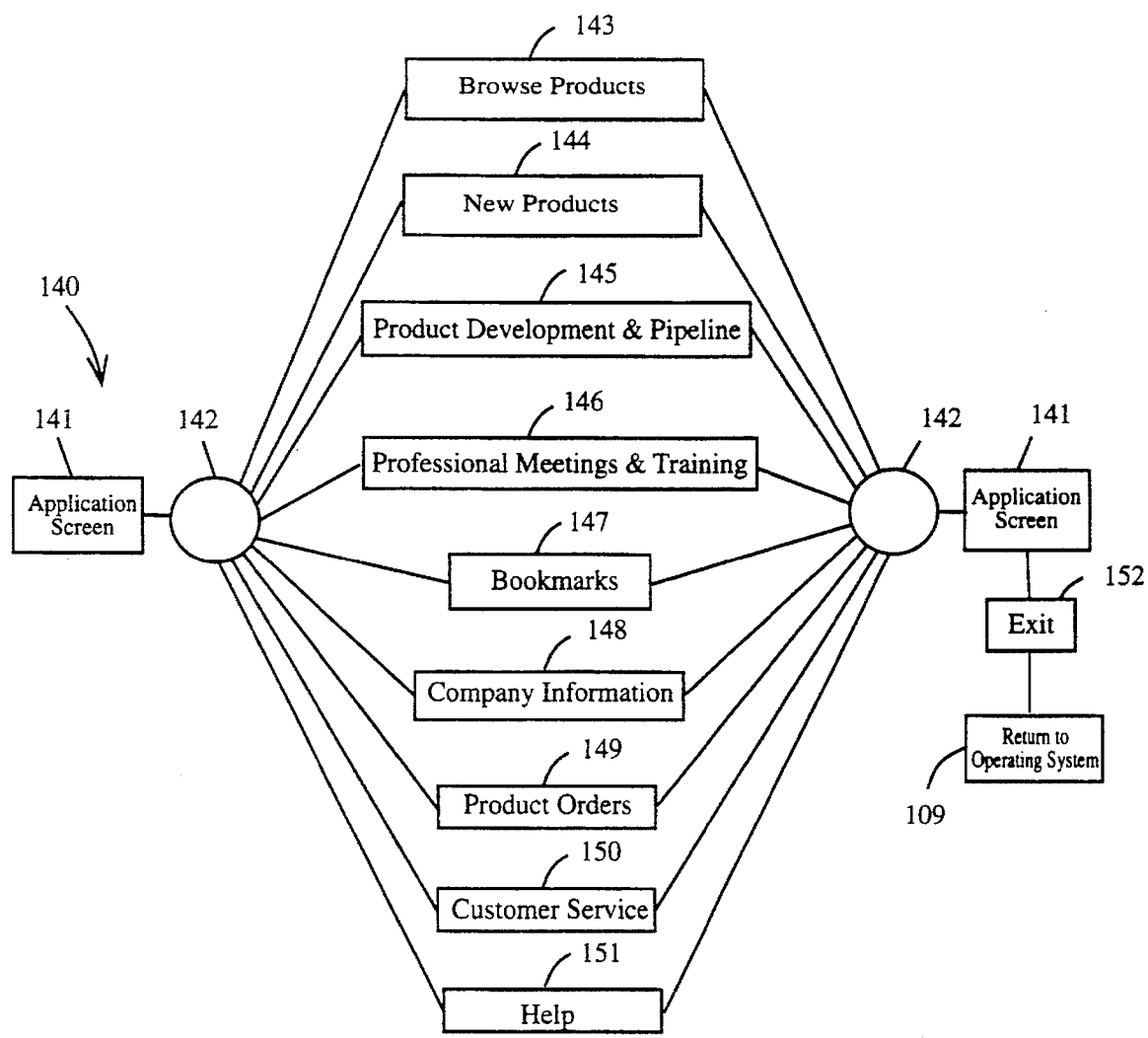
FIG. 14 is a flow chart of the available commands in the Application Menu display generated by the Retrieval module.

(3.) The set of commands used to customize the Application screen provides the means for creating a push button access to an dement window and/or the Session Database. The Product Orders 149 and Company Information 148 commands in FIG. 14 are examples of this type of access. An author provides the label for a push-button and the Retrieval module 3 adds the push-button to the command display in the Application Screen 141 at run time.

The Configuration command also enables an author to assign special graphics like a company logo across the top of an Application screen.

(4.) The last screen in the set is the Object screen. This screen is used to display the elements that make up the information object and transfer Selection Object field values to the Session Database. The set of commands used to customize the Object screen provides the means for integrating the Session Database into the Object screen as well as for adding element windows and element displays to the screen.

An author assigns a trigger event to the object screen's configuration settings to integrate the Session database into the screen. A trigger event—selecting an entry from an element window- activates the Retrieval module 3 to copy information about the access path and/or the selected fields associated with the current object into the Session Database. Here, the many-to-one element window is used to collect input from the end-user.

In the disclosed electronic catalog the trigger-event, selecting an entry from the PRICES element window in the Product Screen, copies all of the field values in the PRICES record into a new Selection Object which is added to the Session Database.

(f.) The Distribution Files command 139 provides the means for generating the Distribution files 2. These files can be configured for specific computer media and host operating system environments. When multiple media disks are required to distribute the data files, the Application Generator 1 creates a directory of objects for each disk to enable the author to assign meaningful logical name to each disk group. The logical names are then used by the Retrieval module 3 to help the end-user identify a particular disk.

FIG. 14 shows the functional flow chart of the main commands in the disclosed electronic catalog. In addition to collecting product information in one place and providing a powerful access to the products, the disclosed electronic catalog adds additional value to the information service by helping the buyer manage the purchasing data. For instance, integrated features in the disclosed electronic catalog can be used by a buyer to manage and track product budgets, purchases, and partial shipments.

The Retrieval module 3 configures the Application Screen 14 1 at run-time based on information in the menu data file 33 and the configuration data file 34. The Retrieval module 3 supports three different types of menu commands in an Application screen: standard commands; search commands; and special system feature commands programmed by the author.

For instance in the Application Screen in FIG. 14, the Bookmark command 147, the Customer Service command 150, and the Exit command 152 are standard commands features in every Information System produced by the Retrieval module 3. The Browse Products command 143, the New Products command 144, the Product Development & Pipeline command 145, the Professional Meetings & Training command 146, and the Help command 151 represent search commands. Search commands represent the access paths in segments of the open hierarchical data structure that were built by an author and stored in, and read from, the menu data file 33. And finally, the Product Orders command 149 and the Customer Information command 148 represent special system feature commands that have been programmed by the author and recorded in the configuration data file 34.

When the disclosed electronic catalog is activated the Application Screen 141 is shown. The end-user selects one of its commands at step 142. Upon returning from one of these commands the Application Screen 141 is shown. The Exit command 152 returns the end-user to the operating system 109. The Application Screen 141 includes the following commands, (a.) The Browse Products command 143 provides the means for looking up products based on the organization of the open hierarchical data structure created by the author. The succession of selection menu entries eventually narrows down the products to highly specific details in the product specification like DNA cutting sites and incubation periods.

(b.) The New Products command 144 provides access paths in the open hierarchical data structure to new products.

(c.) The Product Development & Pipeline command 145 provides access paths to a selection of products currently under development with projected released dates in the near future.

(d.) The Professional Meetings and Training command 146 provides menu access to a selection of information on professional meetings and training sessions. This search path is also based on the open hierarchical data structure.

(e.) The Bookmarks command 147 provides the means for displaying a list of all current bookmarks set on product objects and selection menus. The list is derived from the bookmark data file 36. When an end-user selects a bookmark from the list the Retrieval module 3 recreates a previously selected menu path or product screen.

(f.) The Company Information command 148 provides the means for creating a selection menu of company names drawn from the company data file 35. When an end-user selects an entry the Retrieval module 3 displays detailed information about the company in the Supplier element window.

(g.) The Product Orders command 149 provides the means for managing product orders stores in the order data file 37. This command is also used for reviewing and modifying product orders and generating the electronic documents needed to place an order with a supplier. This includes output like electronic data interface (EDI) formats as well as files formatted for hardcopy output and fax transmission. The Retrieval module 3 also provides the means to transfer electronic documents directly to a supplier using its integrated communications capabilities.

(h.) The Customer Service command 150 provides the means for managing the end-user files 12 and host computer configuration for the disclosed electronic catalog. This includes the ability to adjust screen height and width, adjust the display environment, set communication parameters for the fax and modem, and if desired, to install the product dam files 20 on the computer's hard drive. It also includes a sign-in registry for access control and features to manage orphaned field notes, bookmarks, and product orders.

(i.) The Help command 151 provides the means to access help information provided by the author of the disclosed electronic catalog.

Figure 15:
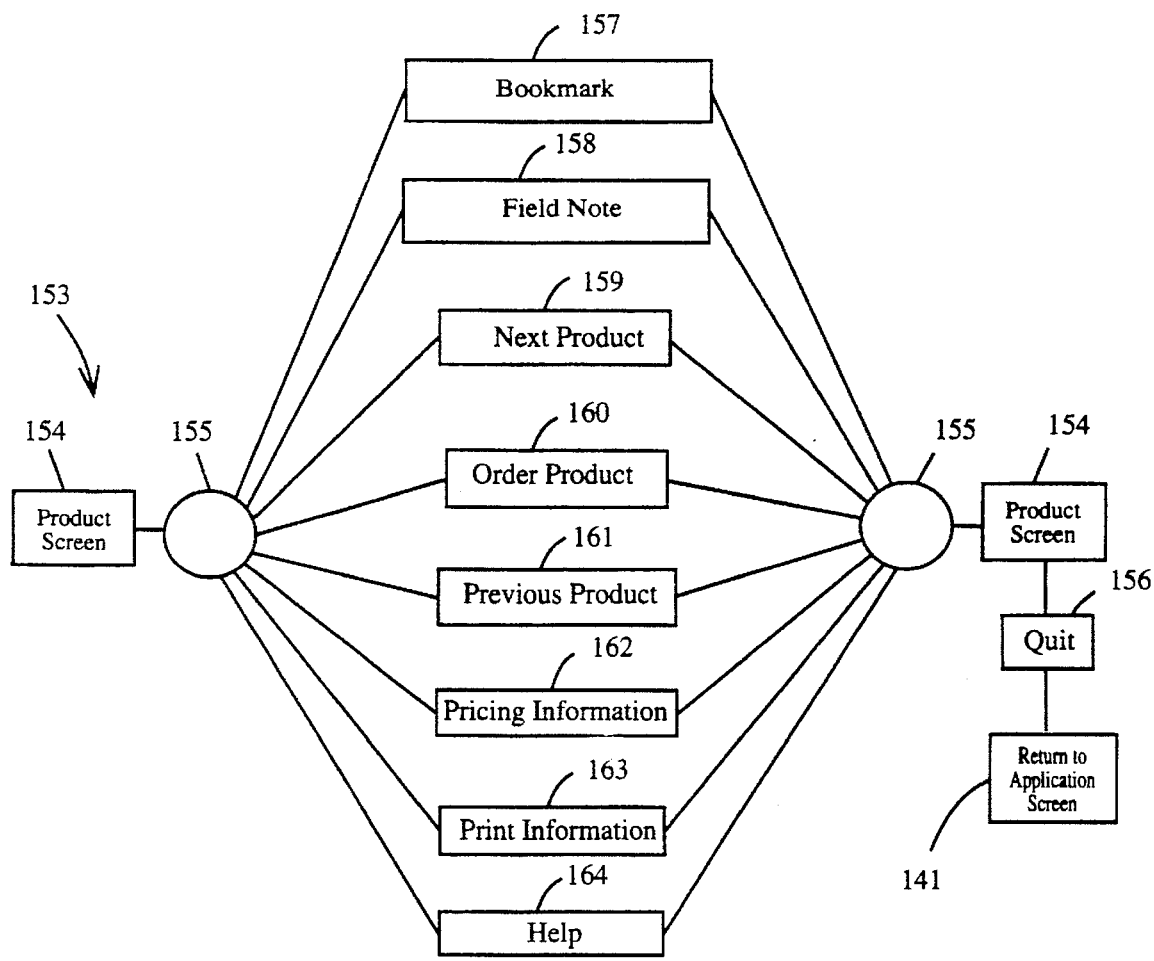
FIG. 15 is a flow chart for the commands in the Product Screen generated by the Retrieval module.

FIG. 15 shows the functional flow chart of the commands available at the Product Screen display 154 in the disclosed electronic catalog. The Product Screen display 154 is shown when an end-user has completed the succession of selection menus in a menu path and has reached a product object. A graphical representation of the Product Screen was presented earlier in FIG. 8.

At the Product Screen 154 the end-user selects one of its commands at step 155. After the command is executed the Product Screen 154 is again shown. When the QUIT command 156 is selected the end-user is returned to the Application Screen 141 and the last selection menu 165 in the succession of selection menus which brought her to Product Screen 154. At this point she may continue to select another entry in the current selection menu or back-up to a prior selection menu.

The commands available to the end-user in the Product Screen display 154 are accessed through push-buttons and include the following, (a.) The Bookmark command 157 provides the means for placing an electronic bookmark on the current Product Screen. An end-user assigns a brief, one line comment to the bookmark and retrieves it with the Bookmark command 147 in the Application Screen 141. The system stores bookmark information in the bookmark data file 36 and maintains links to product objects over updates of the Distribution files 2. That is, unless a product has been deleted from the system, in which case the disclosed electronic catalog issues an error message.

(b.) The Field Note command 158 enables an end-user to create and edit a variable-length text field linked to the current product. This feature is used by a buyer to keep track of information that is not documented in the product description. When selected, the information is displayed in a scrolling region of a pop-up window on the screen. The Retrieval module 3 stores this information in the note data file 38 and maintains the linkage between a product object and notes created by an end-user throughout the course of updates of the Distribution files 2.

(c.) The Next Product command 159 and Previous Product command 161 provide the means for looking at more than one product when multiple products are located together at the end of the same menu path.

(d.) The Order Product command 160 provides the means for adding the current product to a product order. When this command is selected the Retrieval module 3 displays the PRICES element window, a trigger-event defined by the author. The end-user orders the product by selecting one of the unit-price entries in the menu. Specific fields in the selected entry, like the catalog number, number of units, and price, are copied directly into the Selection Object and added to the Session database. This approach totally eliminates any possibility of an end-user introducing a typo or an illegible entry in the order form.

(e.) The Pricing Information command 162 provides the means to produce a read-only, pop-up window of pricing information for the current product.

(f.) The Print Information command 163 provides the means for outputting the associated text and visual media elements in the current product.

(g.) The Help command 164 displays help provided by the author for the Product Screen commands.

What is claimed is:

1. An information management system comprising:

means for creating an open hierarchical data structure having a plurality of nodes, a plurality of information objects, and a plurality of paths for connecting nodes to nodes, and nodes to an information object at the end of said paths in said open hierarchical data structure whereby a plurality of said paths connects to the same said information object;

means for creating said information object by associating a plurality of media elements, each media element having a plurality of fields;

means for creating at least one file according to a predetermined file format, said at least one file including said plurality of information objects and said open hierarchical data structure, said open hierarchical data structure including the means for locating said information object;

means for accessing said at least one file for dynamically building a plurality of selection menus corresponding to said paths in said open hierarchical data structure; and means for displaying each said information object disposed at the end of each said path.

2. The information management system of claim 1 wherein said system is implemented in a computer program language that is compatible with at least one computer operating system.

3. The information management system of claim 1, further including means for displaying user interface components that adjust to said computing operating system, and adjust to a display device at run time.

4. The information management system of claim 1, wherein said open hierarchical data structure includes one branching node in said path, and at least one data node at the end of said path that links to said media elements to generate said information object.

5. The information management system of claim 4, wherein said open hierarchical data structure further includes means for associating a coded value with said at least one branching node.

6. The information management system of claim 4, wherein said open hierarchical data structure further includes means for creating sibling lists that include at least said at least one branching node and said at least one data node.

7. The information management system of claim 4, wherein said open hierarchical data structure further includes means for creating a plurality of data nodes, including said at least one data node, that links to the same said media elements to generate the same said information object.

8. The information management system of claim 1, further including means for interactively removing and reattaching a plurality of connected nodes in said open hierarchical data structure.

9. The information management system of claim 1, further including the means for generating reports and listings on said paths in said open hierarchical data structure.

10. The information management system of claim 1, further including means for customizing display characteristics of each entry in each selection menu in said plurality of selection menus.

11. The information management system of claim 1, further including means for customizing an interface used to display said information object.

12. The information management system of claim 1, further including means for creating a session database adapted to store copies of selected field values from said plurality of media elements in said information object, and copies of said coded value associated with at least one said branching node in said path used to reach said information object.

13. the information management system of claim 1 further including means for creating said at least one file for a variety of computer media.

14. The information management system of claim 1, further including the means for configuring a plurality of formatted files, including at least one formatted file so as to facilitate read access from a mass storage device.

15. The information management system of claim 1, further including the means for creating said at least one file for storing at least one media element in said plurality of media elements that has a one-to-many relationship to said information object.

16. The information management system of claim 1, further includes means for storing a set of configuration data on said session database and on said interface used to display said information object in said at least one file.

17. The information management system of claim 1, further including stand-alone means, cooperative with said means for accessing said at least one file and for dynamically building said plurality of selection menus, and with said means for displaying each said information object, for providing a stand-alone information system.

18. The information management system of claim 17, wherein said stand-alone means further includes display and interface windows for displaying said media elements, and means for configuring said display and interface windows at run time using said set of configuration data stored in said at least one file.

19. The information management system of claim 17, wherein said stand-alone means further includes means for storing a path used to reach said selection menu.

20. The information management system of claim 17, wherein said stand-alone means further includes means configuring said session database and storing at least one session object in a session database, and means for generating reports on said at least one session object.

21. An electronic catalog management system comprising; means for creating an open hierarchical data structure having a plurality of nodes, a plurality of product objects, and a plurality of paths for connecting nodes to nodes, and nodes to a product object in said open hierarchical data structure whereby a plurality of said paths connects to the same said product object;

means for creating said product object by associating a plurality of media elements;

means for creating at least one file according to a predetermined file format, that includes said plurality of product objects and said open hierarchical data structure, said open hierarchical data structure including the means for locating said product object; and means for accessing said at least one file for dynamically building a plurality of selection menus corresponding to said paths in said open hierarchical data structure;

means for displaying each said product object at the end of said path; and means for generating a product order based on selected fields in said product object.

22. The electronic catalog management system of claim 21, wherein said system is implemented in a computer program language that is compatible with at least one computer operating system.

23. The electronic catalog management system of claim 21, further including means for displaying user interface components that adjust to said computing operating system, and adjust to a display device at run time.

24. The electronic catalog management system of claim 21 further including means for interactively removing and reattaching a plurality of connected nodes in said open hierarchical data structure.

25. The electronic catalog management system of claim 21, further including means for associating a coded value to a node in said plurality of nodes in a path in said plurality of paths.

26. The electronic catalog management system of claim 21, further including means for generating reports and listings on said paths in said open hierarchical data structure.

27. The electronic catalog management system of claim 21, further includes means for generating said at least one file to a variety of computer media.

28. The electronic catalog management system of claim 21, further including means for creating an order database adapted to store copies of selected field values from said plurality of media elements in said product object; and copies of said coded values associated with said branching node in said path used to reach said product object.

29. The electronic catalog management system of claim 21, further including means for customizing display charteristics of each entry in each selection menu in said plurality of selection menus.

30. The electronic catalog management system of claim 21, further including stand-alone means, cooperative with said means for accessing at least one file and dynamically building said plurality of selection menus, and with said means for displaying said product object, and with said means for generating a product order, for providing a stand-alone electronic catalog system that further includes, (a) means for reviewing and updating said product order;

(b) means for automatically outputting said product order to a plurality of special file formats;

(c) means for electronically transmitting said product order to a supplier;

(d) means for creating notes linked to said product object across updates on said at least one file; and (e) means for retrieving said coded value associated with said node in said path to reach said product object and the means for associating said coded values in said path to said product object in said product order.

* * * * *